(12) United States Patent
Hatahori et al.

(10) Patent No.: US 12,360,052 B2
(45) Date of Patent: Jul. 15, 2025

(54) DEFECT INSPECTION APPARATUS AND DEFECT INSPECTION METHOD

(71) Applicant: Shimadzu Corporation, Kyoto (JP)

(72) Inventors: Takahide Hatahori, Kyoto (JP); Kenji Takubo, Kyoto (JP); Koki Yoshida, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 240 days.

(21) Appl. No.: 17/793,649

(22) PCT Filed: Oct. 9, 2020

(86) PCT No.: PCT/JP2020/038307
§ 371 (c)(1),
(2) Date: Jul. 19, 2022

(87) PCT Pub. No.: WO2021/149307
PCT Pub. Date: Jul. 29, 2021

(65) Prior Publication Data
US 2023/0085940 A1   Mar. 23, 2023

(30) Foreign Application Priority Data
Jan. 23, 2020   (JP) ................... 2020-009395

(51) Int. Cl.
*G01N 21/88*   (2006.01)
*G01N 21/45*   (2006.01)
*G06T 7/00*   (2017.01)

(52) U.S. Cl.
CPC ......... *G01N 21/8851* (2013.01); *G01N 21/45* (2013.01); *G06T 7/001* (2013.01); *G06T 2207/30108* (2013.01)

(58) Field of Classification Search
CPC .... G01N 21/8851; G01N 21/45; G01N 21/94; G01N 2021/8427; G06T 7/001;
(Continued)

(56) References Cited

U.S. PATENT DOCUMENTS

2017/0350690 A1   12/2017   Hatahori et al.
2019/0204275 A1*  7/2019   Hatahori ............ G01N 29/0654

FOREIGN PATENT DOCUMENTS

JP   2017219318   12/2017
WO   2017221324   12/2017

OTHER PUBLICATIONS

"Office Action of Japan Counterpart Application", issued on Jun. 27, 2023, with English translation thereof, p. 1-p. 6.
(Continued)

*Primary Examiner* — Huy C Ho
(74) *Attorney, Agent, or Firm* — JCIPRNET

(57) ABSTRACT

A defect inspection apparatus (100) is configured to approximate a difference value or an absolute value (Iα) of the difference value between a pixel value in at least three captured images (A) captured by an imager in at least three different phases of an elastic wave and a pixel value in a reference image ($A_{ave}$) separate from the captured images (A) so as to acquire an approximate value for defect inspection corresponding to an amount of change in the pixel value in the captured images (A).

10 Claims, 11 Drawing Sheets

(58) Field of Classification Search
CPC . G06T 2207/30108; G06T 2207/10152; G06T 2207/30136; G01H 9/00; G01M 7/00; G01B 11/30
USPC ........................................................ 382/141
See application file for complete search history.

(56) References Cited

OTHER PUBLICATIONS

"International Search Report (Form PCT/ISA/210) of PCT/JP2020/038307," mailed on Dec. 15, 2020, with English translation thereof, pp. 1-4.
"Written Opinion of the International Searching Authority (Form PCT/ISA/237) of PCT/JP2020/038307," mailed on Dec. 15, 2020, with English translation thereof, pp. 1-4.
"Office Action of China Counterpart Application", issued on May 1, 2025, with English translation thereof, p. 1-p. 15.

* cited by examiner

DEFECT INSPECTION APPARATUS AND DEFECT INSPECTION METHOD

CROSS-REFERENCE TO RELATED APPLICATION

This application is a 371 application of the International PCT application serial no. PCT/JP2020/038307, filed on Oct. 9, 2020, which claims the priority benefits of Japan Patent Application No. 2020-009395, filed on Jan. 23, 2020. Each of the entirety of the above-mentioned patent applications is hereby incorporated by reference herein and made a part of this specification.

TECHNICAL FIELD

The present invention relates to a defect inspection apparatus and a defect inspection method.

BACKGROUND ART

Conventionally, a defect inspection apparatus using laser interferometry is known. Such a defect inspection apparatus is disclosed in Japanese Patent Laid-Open No. 2017-219318, for example.

A defect inspection apparatus described in Japanese Patent Laid-Open No. 2017-219318 includes an excitation unit that excites an elastic wave in an object to be inspected, an illumination unit that emits strobe illumination to a measurement region on a surface of the object to be inspected, and a displacement measurement unit. The displacement measurement unit collectively measures a displacement of each point in the measurement region in a forward-rearward direction in at least three different phases of the elastic wave by controlling the phase of the elastic wave and the timing of the strobe illumination. The defect inspection apparatus described in Japanese Patent Laid-Open No. 2017-219318 shifts the phase of the strobe illumination by a laser light source in each phase of the elastic wave to measure the displacement of each point in the measurement region in the forward-rearward direction at three or more different phase shift amounts using laser interferometry. Then, the defect inspection apparatus measures the vibration state (amplitude and phase) of each point in the measurement region based on the measured displacement. A configuration in which an image illustrating a difference in the displacement due to vibrations by a difference in brightness of an image is created based on the measured vibration state (amplitude and phase) of each point in the measurement region, and the created image is visually confirmed by an inspector such that a discontinuous portion of the vibration state is detected as a defect is disclosed. The laser interferometry is a method for detecting a displacement of each point in a measurement region by emitting laser light from a laser light source, causing the laser light reflected at each point in the measurement region and reference laser light emitted from the same laser light source and then passing through a different optical path to interfere with each other, and measuring the intensity of the interference light. The laser interferometry includes a method in which laser light emitted from a laser light source is branched and used as reference laser light, and a method in which laser light reflected from a different point or region in a measurement region is used as reference laser light.

PRIOR ART

Patent Document

Patent Document 1: Japanese Patent Laid-Open No. 2017-219318

SUMMARY OF THE INVENTION

Problem to be Solved by the Invention

However, when the displacement of each point in the measurement region in the forward-rearward direction (the out-of-plane direction of each point in the measurement region) is measured using the laser interferometry as in the defect inspection apparatus described in Japanese Patent Laid-Open No. 2017-219318, a phase difference between two rays of interfered laser light is changed such that the laser light caused to interfere with each other at three or more different phase differences is measured in order to measure the displacement at each point in the measurement region. The laser light caused to interfere with each other at three or more different phase differences is measured in order to measure the displacement in one phase of the elastic wave, and thus when the displacement is measured in each of at least the three different phases of the elastic wave, it is necessary to make at least nine measurements while changing the phase difference of the laser light. Therefore, at least nine measurements are made while the phase difference of the laser light is changed, and thus it takes time to perform a defect inspection. Thus, it is desired to develop a defect inspection apparatus and a defect inspection method each capable of shortening the inspection time required when a defect inspection is performed based on laser interferometry.

The present invention is intended to solve the above problem. The present invention aims to provide a defect inspection apparatus and a defect inspection method each capable of shortening the inspection time required when a defect inspection is performed based on interference light obtained by causing interference of laser light reflected at a measurement region.

Means for Solving the Problem

In order to attain the aforementioned object, a defect inspection apparatus according to a first aspect of the present invention includes an exciter configured to excite an elastic wave in a measurement region of an inspection target, an irradiator configured to emit laser light to the measurement region, an interference unit configured to cause interference of the laser light reflected at the measurement region by laser interferometry, an imager configured to image the interfered laser light, and a controller configured or programmed to control the exciter and control imaging of the interfered laser light by the imager. The controller is configured or programmed to approximate a difference value or an absolute value of the difference value between a pixel value in at least three captured images captured by the imager in at least three different phases of the elastic wave and a pixel value in a reference image separate from the captured images so as to acquire an approximate value for defect inspection corresponding to an amount of change in the pixel value in the captured images.

A defect inspection method according to a second aspect of the present invention includes exciting an elastic wave in a measurement region of an inspection target, emitting laser light to the measurement region, causing interference of the laser light reflected at the measurement region by laser interferometry, imaging the interfered laser light, and approximating a difference value or an absolute value of the difference value between a pixel value in at least three captured images captured in at least three different phases of the elastic wave and a pixel value in a reference image separate from the captured images to acquire an approximate value for defect inspection corresponding to an amount of change in the pixel value in the captured images.

Effect of the Invention

In the defect inspection apparatus according to the first aspect and the defect inspection method according to the second aspect, the difference value or the absolute value of the difference value between the pixel value in at least the three captured images captured by the imager in at least the three different phases of the elastic wave and the pixel value in the reference image separate from the captured images is approximated to acquire the approximate value for defect inspection corresponding to the amount of change in the pixel value in the captured images. Accordingly, the approximate value for defect inspection is acquired based on the pixel value in the captured images, and thus the defect inspection can be performed without measuring the displacement of the measurement region in an out-of-plane direction even when the defect inspection is performed based on interference light obtained by causing interference of the laser light reflected at the measurement region. That is, the defect inspection can be performed by approximately detecting the state of the elastic wave excited in the measurement region without measuring the displacement of the measurement region. Therefore, the defect inspection can be performed based on the state of the elastic wave approximately detected without changing a phase difference between two rays of the interfered laser light, and thus it is no longer necessary to make a plurality of measurements while changing the phase difference of the laser light in one phase of the elastic wave. That is, the defect inspection can be performed by making a smaller number of measurements (at least three measurements) as compared with a case in which a plurality of measurements (at least nine measurements) are made while the phase difference between two rays of the interfered laser light is changed for each phase of the elastic wave. Consequently, it is possible to shorten the inspection time required when the defect inspection is performed based on the interference light obtained by causing interference of the laser light reflected at the measurement region.

MODES FOR CARRYING OUT THE INVENTION

Embodiments embodying the present invention are hereinafter described on the basis of the drawings.

First Embodiment (Overall Configuration of Defect Inspection Apparatus)

A defect inspection apparatus 100 according to a first embodiment is now described with reference to FIGS. 1 to 3.

Figure 1:
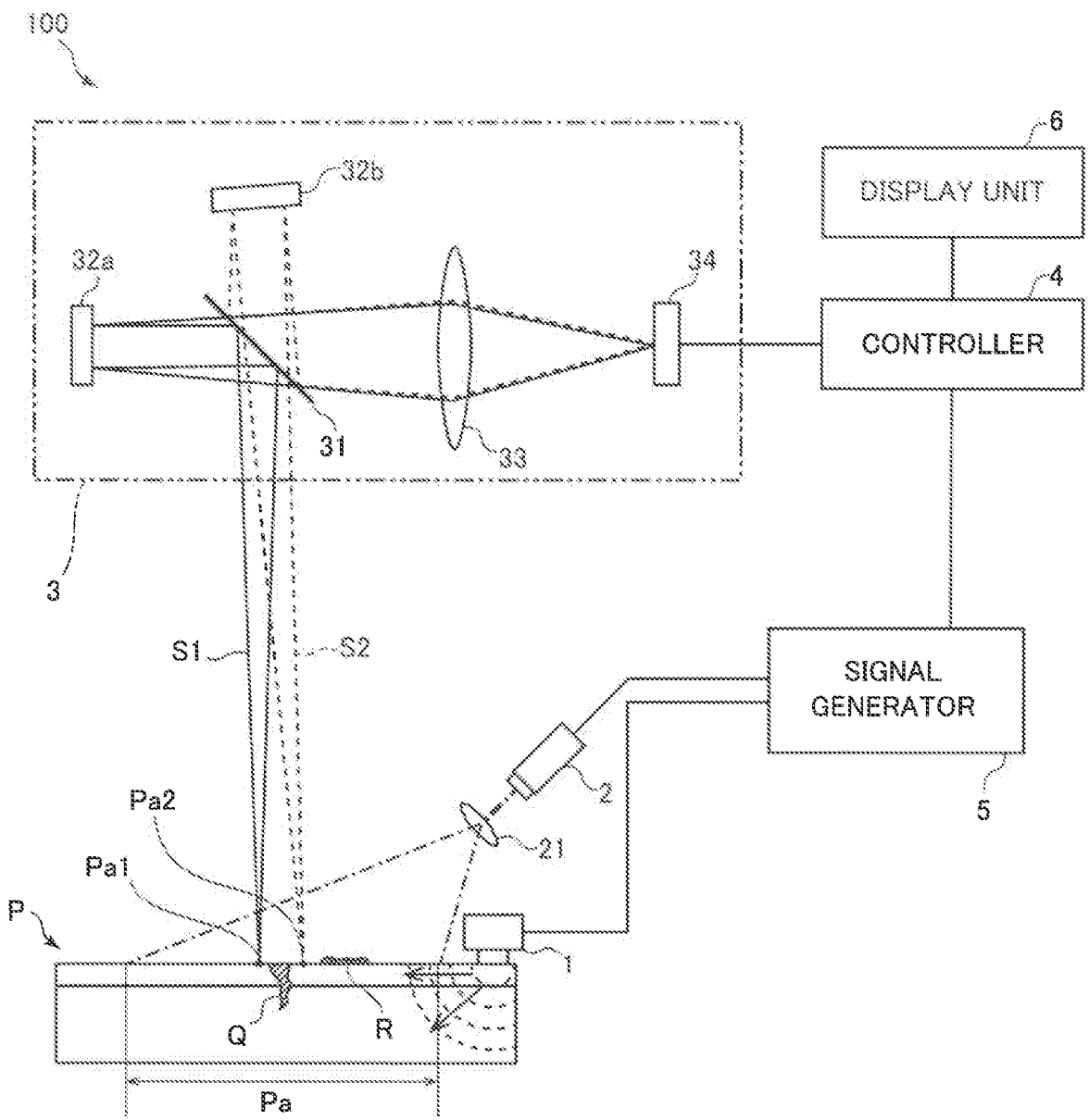
FIG. 1 is a diagram illustrating the configuration of a defect inspection apparatus according to a first embodiment.

As shown in FIG. 1, the defect inspection apparatus 100 according to the first embodiment includes a vibrator 1, an irradiator 2, a speckle shearing interferometer 3, a controller 4, a signal generator 5, and a display unit 6. The vibrator 1 is an example of an "exciter" in the claims, and the speckle shearing interferometer 3 is an example of an "interference unit" in the claims.

The vibrator 1 and the irradiator 2 are connected to the signal generator 5 via a cable.

The vibrator 1 excites an elastic wave in a measurement region Pa of an inspection target P. Specifically, the vibrator 1 is arranged so as to be in contact with the inspection target P, and converts an AC signal from the signal generator 5 into mechanical vibrations to excite an elastic wave in the measurement region Pa.

The irradiator 2 emits laser light to the measurement region Pa of the inspection target P. The irradiator 2 includes a laser light source, which is not shown. The laser light emitted from the laser light source is diffused by an illumination light lens 21 to be emitted to the entire measurement region Pa on a surface of the inspection target P. Furthermore, the irradiator 2 emits the laser light at the predetermined timing based on an electric signal from the signal generator 5. That is, the irradiator 2 emits the laser light to the inspection target P corresponding to the elastic wave by the vibrator 1. The laser light source is a laser diode, for example, and emits laser light (near infrared light) having a wavelength of 785 nm.

The speckle shearing interferometer 3 causes interference of the laser light reflected at the measurement region Pa by laser interferometry. The speckle shearing interferometer 3 causes interference of the laser light reflected at different two points in the measurement region Pa excited by the vibrator 1 by the laser interferometry. The speckle shearing interferometer 3 includes a beam splitter 31, a first reflecting mirror 32a, a second reflecting mirror 32b, a condenser lens 33, and an image sensor 34. The image sensor 34 is an example of an "imager" in the claims.

The beam splitter 31 includes a half mirror. The beam splitter 31 is arranged at a position that the laser light reflected at the measurement region Pa of the inspection target P enters. The beam splitter 31 reflects the incident laser light toward the first reflecting mirror 32a as shown in an optical path indicated by a solid line S1 in FIG. 1, and transmits the incident laser light toward the second reflecting mirror 32b as shown in an optical path indicated by a broken line S2 in FIG. 1. Furthermore, the beam splitter 31 transmits the incident laser light reflected by the first reflecting mirror 32a toward the image sensor 34 as shown in an optical path indicated by the solid line S1 in FIG. 1, and reflects the laser light reflected by the second reflecting mirror 32b toward the image sensor 34 as indicated by the broken line S2 in FIG. 1.

The first reflecting mirror 32a is arranged on the optical path of the laser light reflected by the beam splitter 31 at 45 degrees with respect to the reflective surface of the beam splitter 31. The first reflecting mirror 32a reflects the laser light reflected by the beam splitter 31 toward the beam splitter 31.

The second reflecting mirror 32b is arranged on the optical path of the laser light transmitted through the beam splitter 31 at an angle slightly inclined from the angle of 45 degrees with respect to the reflective surface of the beam splitter 31. The second reflecting mirror 32b reflects the incident laser light transmitted through the beam splitter 31 toward the beam splitter 31.

The condenser lens 33 is arranged between the beam splitter 31 and the image sensor 34 and collects the laser light (the solid line S1 in FIG. 1) transmitted through the beam splitter 31 and the laser light (the broken line S2 in FIG. 1) reflected by the beam splitter 31.

The image sensor 34 images the interfered laser light. The image sensor 34 includes a large number of detection elements, and is arranged on the optical paths of the laser light (the solid line S1 in FIG. 1) reflected by the first reflecting mirror 32a after being reflected by the beam splitter 31 and transmitted the beam splitter 31 and the laser light (the broken line S2 in FIG. 1) reflected by the second reflecting mirror 32b after being transmitted through the beam splitter 31 and reflected by the beam splitter 31. The image sensor 34 includes a CMOS image sensor or a CCD image sensor, for example.

In the speckle shearing interferometer 3, for example, the laser light (the solid line S1 in FIG. 1) reflected by a position Pa1 on a surface of the measurement region Pa and the first reflecting mirror 32a and the laser light (the broken line S2 in FIG. 1) reflected by a position Pa2 on the surface of the measurement region Pa and the second reflecting mirror 32b interfere with each other and enter the same portion of the image sensor 34 (are detected in the same element). The position Pa1 and the position Pa2 are spaced apart from each other by a minute distance. The laser light reflected from different positions in the measurement region Pa is guided by the speckle shearing interferometer 3 and enters the image sensor 34.

The controller 4 controls each portion of the defect inspection apparatus 100. The controller 4 controls the vibrator 1 and controls imaging of the interfered laser light by the image sensor 34. The controller 4 includes a computer including a CPU (central processing unit), for example. The control of the controller 4 is described below in detail.

The display unit 6 displays an image generated by the controller 4 and showing the vibration state of the elastic wave excited in the measurement region Pa of the inspection target P. The display unit 6 includes a liquid crystal display or an organic EL (electroluminescence) display.

The inspection target P is a coated steel plate in which a coating film is applied on a steel plate. A defective portion Q is generated at the inside (surface layer/surface) of the measurement region Pa and includes cracks and/or peeling, for example. Furthermore, a defective portion R is generated on the outer surface of the measurement region Pa and is represented by dirt or a deposit adhering to the outer surface, a minute unevenness, or the like.

(Control by Controller)

The controller 4 controls the vibration of the vibrator 1 by controlling the signal generator 5. That is, the controller 4 controls the frequency and phase of the elastic wave excited in the measurement region Pa of the inspection target P by controlling the signal generator 5. Similarly, the controller 4 controls the operation of the irradiator 2 by controlling the signal generator 5. That is, the controller 4 controls the timing of the emission of the laser light by the irradiator 2 by controlling the signal generator 5. The controller 4 causes the irradiator 2 to emit laser light to the measurement region Pa of the inspection target P in a predetermined phase of the elastic wave by controlling the phase of the elastic wave excited by the vibrator 1 and the timing of emitting the laser light by the irradiator 2.

The controller 4 controls the image sensor 34 to image light obtained by the speckle shearing interferometer 3 causing interference of the laser light reflected at the measurement region Pa of the inspection target P. That is, the light obtained by causing interference of the laser light reflected at each point in the measurement region Pa is detected by each of the detection elements of the image sensor 34. The controller 4 generates a plurality of captured images A based on the intensity signal of the interfered laser light detected by each of the detection elements of the image sensor 34.

The controller 4 acquires the vibration state of the elastic wave excited in the measurement region Pa based on the pixel value of each of pixels included in the captured images A. The pixel value in the captured images A refers to a value indicating the intensity of the interfered laser light detected by the plurality of detection elements included in the image sensor 34. Specifically, the pixel value in the captured images A indicates the luminance value of each of the pixels included in the captured images A. The controller 4 generates an image representing the vibration state of the elastic wave based on the pixel value in the captured images A.

Specifically, in the first embodiment, the controller 4 approximates the absolute value $I\alpha$ of a difference value between each luminance value I in at least three captured images A captured by the image sensor 34 in at least three different phases of the elastic wave and each luminance value $I_{ave}$ in a reference image $A_{ave}$ separate from the captured images A to acquire an amplitude D (approximate value) for defect inspection corresponding to the amount of change in the luminance value I in the captured images A. The luminance value I and the luminance value $I_{ave}$ are examples of a "pixel value" in the claims. The amplitude D is an example of an "approximate value" in the claims.

For example, the controller 4 processes a detection signal from each detection element according to the following procedure, and generates an approximate value image F (see FIG. 3) that is an image approximately representing the vibration state of the elastic wave (a spatial distribution image of the vibration state).

Figure 2:
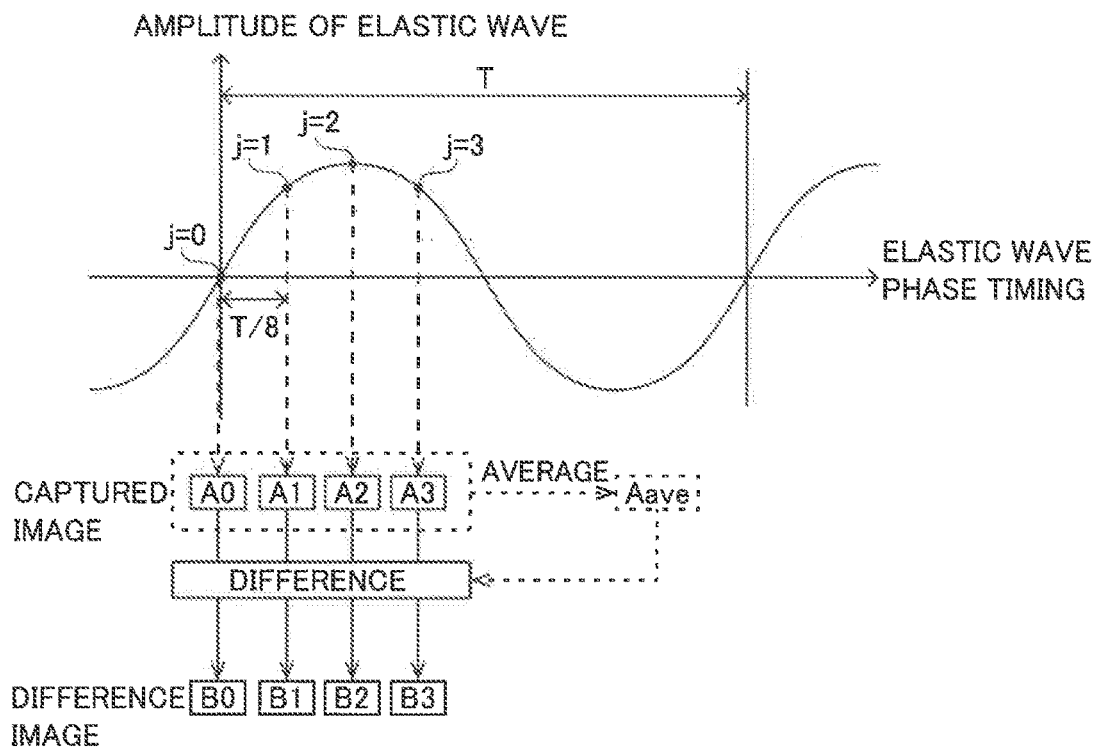
FIG. 2 is a diagram illustrating the timing of capturing an image according to the first embodiment.

As shown in FIG. 2, the controller 4 acquires four captured images $A_j$ ($A_0$ to $A_3$) at timings j (j=0 to 3) in which the phases of the elastic wave differ by T/8 based on the period T of the elastic wave. Then, difference images $B_j$ ($B_0$ to $B_3$) are acquired from the luminance values $I_j$ ($I_0$ to $I_3$) of the acquired captured images $A_j$ ($A_0$ to $A_3$) in the four different phases of the elastic wave by a formula (1):

$$I\alpha_j = |(I_j - I_{ave})/I_{ave}| \ (j=0 \text{ to } 3) \tag{1}$$

where $I\alpha$ ($I\alpha_j$) represents the luminance values of the difference images $B_j$, and $I_{ave}$ represents the luminance value $I_{ave}$ in the reference image $A_{ave}$, which is an average image of the four captured images $A_j$ ($A_0$ to $A_3$). The luminance value $I_{ave}$ is acquired by taking an arithmetic mean of the luminance values $I_j$ ($I_0$ to $I_3$) as shown in a formula (2).

[Mathematical Formula 1]

$$I_{ave} = \frac{1}{4} \sum_{j=0}^{3} I_j \tag{2}$$

That is, $I\alpha$ ($I\alpha_j$) is the absolute value of the difference value between the luminance value I in the captured images A and the luminance value $I_{ave}$ in the reference image $A_{ave}$ separate from the captured images A.

The controller 4 approximates the acquired luminance values ($I\alpha_j$) of the four difference images $B_j$ such that the acquired luminance values ($I\alpha_j$) of the four difference images $B_j$ correspond to an approximation function that is a function representing a waveform. For example, the controller 4 performs a sine wave approximation by the least-square method to acquire D, θ, and C as approximation coefficients in a formula (3), using a function representing a sine wave having half the period T of the elastic wave as an approximation function.

$$I\alpha_j = D \cos(\theta + j\pi/2) = E \exp(j\pi/2) + C \tag{3}$$

E is a complex amplitude and is expressed as a formula (4):

$$E = D \exp(i\theta) = (I\alpha_0 - I\alpha_2) + i(I\alpha_3 - I\alpha_1) \tag{4}$$

where i represents an imaginary unit. The complex amplitude E is image information (two-dimensional spatial information of the complex amplitude) for outputting the image representing the vibration state. The controller 4 acquires the amplitude D by an approximation formula obtained by removing the constant term C from the formula (3) based on the complex amplitude E acquired by the formula (4). The amplitude D is an approximate value for defect inspection corresponding to the amount of change in the luminance value $I_j$ ($I_0$ to $I_3$) in each of the captured images $A_j$ ($A_0$ to $A_3$). In the above process, a spatial filter may be appropriately applied to the complex amplitude E to remove noise. The step (T/8 in the above example) of the timings j of emitting the laser light is not limited to this. In this case, the calculation formula is different from the above formulas (1) to (4). Furthermore, the acquired captured images $A_j$ ($A_0$ to $A_3$) may be downsampled in advance to reduce the image size (with the number of pixel values reduced), and the above process may be performed.

Figure 3:
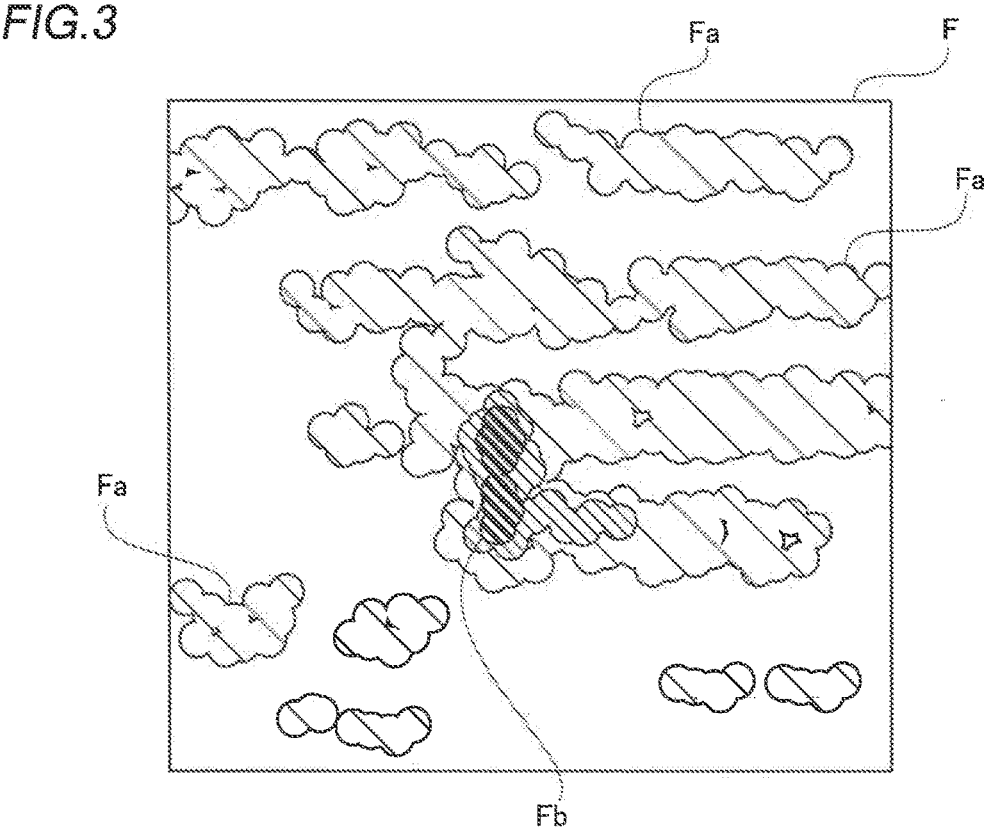
FIG. 3 is a diagram illustrating an approximate value image according to the first embodiment.

As shown in FIG. 3, the controller 4 performs the above process on each pixel of the captured images A to generate the approximate value image F approximately representing the state of distribution of the amount of change in the luminance value I in each pixel of the captured images A. The approximate value image F is generated based on the amplitude D, which is an approximate value for defect inspection acquired in each pixel of the captured images A. Specifically, the controller 4 generates the approximate value image F visually recognizably showing the magnitude of the amplitude D in each pixel of the captured images A by expressing the magnitude of the amplitude D by a difference in color (red for large values and blue for small values). For example, in the approximate value image F of FIG. 3, regions Fa are portions having a relatively small amplitude D. A region Fb is a portion having a relatively large amplitude D, and approximately indicates the position of a defect (defective portion Q).

Thus, the controller 4 generates the approximate value image F, which is an image visually representing the amplitude D that is an approximate value for defect inspection corresponding to the amount of change in each pixel value in the captured images A, without changing a phase difference between two rays of interfered laser light by the above process. Then, the controller 4 displays the approximate value image F on the display unit 6 such that the region in which the value of the amplitude D is large is visually recognizable as the defective portion Q generated inside the inspection target P.

(Defect Inspection Method According to First Embodiment)

Figure 4:
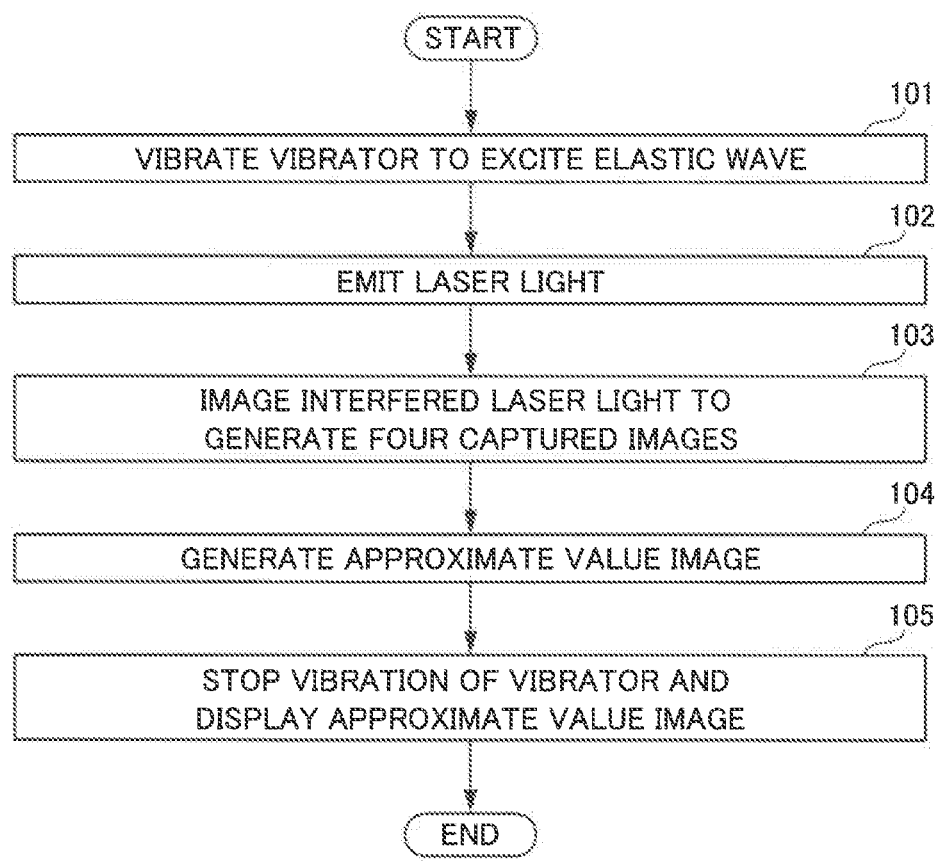
FIG. 4 is a diagram (flowchart) for illustrating a defect inspection method according to the first embodiment.

A defect inspection method using the defect inspection apparatus 100 according to this embodiment is now described with reference to FIG. 4.

First, in step 101, the vibrator 1 excites an elastic wave in the measurement region Pa of the inspection target P.

Then, in step 102, the irradiator 2 emits laser light to the measurement region Pa.

Then, in step 103, the image sensor 34 images the interfered laser light in four different phases of the elastic wave to generate four captured images $A_0$ to $A_3$.

Then, in step 104, an approximate value image F is generated based on the luminance values $I_0$ to $I_3$ of the four captured images $A_0$ to $A_3$.

Then, in step 105, the vibration of the vibrator 1 is stopped, and the approximate value image F, which is an image representing the vibration state of the elastic wave created in step 104, is displayed on the display unit 6.

[Advantages of Defect Inspection Apparatus According to First Embodiment]

In the first embodiment, the following advantages are obtained.

In the defect inspection apparatus 100 according to the first embodiment, as described above, the difference value or the absolute value $I\alpha$ of the difference value between the luminance value I (pixel value) in at least the three captured images A captured by the image sensor 34 (imager) in at least the three different phases of the elastic wave and the luminance value $I_{ave}$ (pixel value) in the reference image $A_{ave}$ separate from the captured images A is approximated to acquire the amplitude D (approximate value) for defect inspection corresponding to the amount of change in the luminance value I in the captured images A. Accordingly, the amplitude D for defect inspection is acquired based on the luminance value I in the captured images A, and thus the defect inspection can be performed without measuring the displacement of the measurement region Pa in the out-of-plane direction even when the defect inspection is performed based on the interference light obtained by causing interference of the laser light reflected at the measurement region Pa. That is, the defect inspection can be performed by approximately detecting the state of the elastic wave excited in the measurement region Pa without measuring the displacement of the measurement region Pa. Therefore, the defect inspection can be performed based on the state of the elastic wave approximately detected without changing a phase difference between two rays of interfered laser light, and thus it is no longer necessary to make a plurality of measurements while changing the phase difference of the laser light in one phase of the elastic wave. That is, the defect inspection can be performed by making a smaller number of measurements (at least three measurements) as compared with a case in which a plurality of measurements (at least nine measurements) are made while the phase difference between two rays of interfered laser light is changed for each phase of the elastic wave. Consequently, it is possible to shorten the inspection time required when the defect inspection is performed based on the interference light obtained by causing interference of the laser light reflected at the measurement region Pa.

The defect inspection apparatus 100 according to the first embodiment is configured as follows such that the following advantages are further obtained.

That is, in the first embodiment, as described above, the speckle shearing interferometer 3 (interference unit) is configured to cause interference of the laser light reflected at different positions in the measurement region Pa by the laser interferometry, and the controller 4 is configured or programmed to approximate the difference value or the absolute value $I\alpha$ of the difference value between the luminance value I (pixel value) in at least the three captured images A and the luminance value $I_{ave}$ (pixel value) in the reference image $A_{ave}$ separate from the captured images A without changing the phase difference between two rays of interfered laser light so as to acquire the amplitude D (approximate value) for defect inspection corresponding to the amount of change in the luminance value I in the captured images A. Accordingly, the state of the elastic wave approximately detected to perform the defect inspection can be acquired without changing the phase difference between two rays of interfered laser light. Therefore, it is not necessary to provide a configuration to change the phase difference of the laser light, and thus an increase in the number of components and a complex apparatus configuration can be significantly reduced or prevented.

In the first embodiment, as described above, the controller 4 is configured or programmed to approximate the difference value or the absolute value $I\alpha$ of the difference value between the luminance value I (pixel value) in at least the three captured images A and the luminance value $I_{ave}$ (pixel value) in the reference image $A_{ave}$ separate from the captured images A such that the difference value or the absolute value $I\alpha$ of the difference value corresponds to the approximation function, which is a function representing a waveform, so as to acquire the amplitude D (approximate value) for defect inspection corresponding to the amount of change in the luminance value I in the captured images A. Accordingly, the state of the elastic wave that is a waveform can be approximately acquired by performing approximation so as to correspond to the approximation function, which is a function representing a waveform. Therefore, as compared with a case in which an approximation function other than the function representing a waveform is used, an error can be reduced when the approximation is performed. Consequently, the state of the elastic wave can be accurately approximated, and thus the accuracy of detecting a defect can be improved.

In the first embodiment, as described above, the approximation function is a function that represents a waveform having half the period of the elastic wave, and the controller 4 is configured or programmed to approximate the absolute value $I\alpha$ of the difference value between the luminance value I (pixel value) in at least the three captured images A and the luminance value $I_{ave}$ (pixel value) in the reference image $A_{ave}$ separate from the captured images A such that the absolute value $I\alpha$ of the difference value corresponds to the function that represents a waveform having half the period of the elastic wave so as to acquire the amplitude D (approximate value) for defect inspection corresponding to the amount of change in the luminance value I in the captured images A. When the difference value between the luminance value I in at least the three captured images A and the luminance value $I_{ave}$ in the reference image $A_{ave}$ separate from the captured images A is approximated in order to approximately represent the state of the elastic wave, the absolute value $I\alpha$ of the difference value is acquired, and the acquired absolute value $I\alpha$ of the difference value is approximated so as to correspond to the function representing a waveform. When the absolute value of the function representing a waveform is acquired, the function representing the absolute value can be represented by a periodic function having half the period of the function representing a waveform. Therefore, the acquired absolute value $I\alpha$ of the difference value can be expressed as a periodic function having half the period of the elastic wave. In consideration of this point, when the amplitude D (approximate value) for defect inspection corresponding to the amount of change in the luminance value I in the captured images A is acquired by approximating the acquired absolute value $I\alpha$ of the difference value such that the acquired absolute value $I\alpha$ of the difference value corresponds to the function representing a waveform having half the period of the elastic wave as in the first embodiment, the state of the elastic wave can be represented more accurately and approximately.

In the first embodiment, as described above, the approximation function is a function that represents a sine wave, and the controller 4 is configured or programmed to approximate the difference value or the absolute value $I\alpha$ of the difference value between the luminance value I (pixel value) in at least the three captured images A and the luminance value $I_{ave}$ (pixel value) in the reference image $A_{ave}$ separate from the captured images A such that the difference value or the absolute value $I\alpha$ of the difference value corresponds to the function that represents a sine wave so as to acquire the amplitude D (approximate value) for defect inspection corresponding to the amount of change in the luminance value I in the captured images A. Accordingly, the function representing a sine wave is used as an approximation function such that the difference value or the absolute value $I\alpha$ of the difference value between the luminance value I in at least the three captured images A and the luminance value $I_{ave}$ in the reference image $A_{ave}$ separate from the captured images A can be approximately expressed using a sine function (cosine function). Therefore, the difference value or the absolute value $I\alpha$ of the difference value that changes with a periodic change in the state of the elastic wave is approximated as a sine function (cosine function), which is a periodic function, such that the magnitude of a change in the difference value or the absolute value $I\alpha$ of the difference value can be approximately expressed as the amplitude of the sine wave. Thus, the state of the elastic wave excited in the measurement region Pa can be shown based on the amplitude of the sine wave approximately represented. Consequently, the state of the elastic wave can be acquired by approximating the difference value or the absolute value $I\alpha$ of the difference value to a sine wave, and thus the state of the elastic wave can be easily expressed from the difference value or the absolute value $I\alpha$ of the difference value.

In the first embodiment, as described above, the reference image $A_{ave}$ is an average image of at least the three captured images A, and the controller 4 is configured or programmed to acquire the amplitude D (approximate value) for defect inspection corresponding to the amount of change in the luminance value I in the captured images A based on the difference value or the absolute value $I\alpha$ of the difference value between the luminance value I (pixel value) in at least the three captured images A and the luminance value $I_{ave}$ (pixel value) in the average image of at least the three captured images A. Accordingly, when the difference value or the absolute value $I\alpha$ of the difference value between the luminance value I in at least the three captured images A and the luminance value $I_{ave}$ in the reference image $A_{ave}$ is acquired, the average image of at least the three captured images A can be used as the reference image $A_{ave}$. Consequently, it is not necessary to capture a new image separately from at least the three captured images A in order to acquire the reference image $A_{ave}$, and thus it is possible to significantly reduce or prevent an increase in the time and effort for acquiring the reference image $A_{ave}$ and shorten the inspection time required when the defect inspection is performed.

In the first embodiment, as described above, the approximate value image F that represents the amplitude D (approximate value) for defect inspection corresponding to the amount of change in the luminance value I (pixel value) in the captured images A is generated. Accordingly, the amplitude D corresponding to the amount of change in the luminance value I in the captured images A can be visually recognized. Therefore, the approximate state of the elastic wave excited in the measurement region Pa can be visually recognized from the amplitude D corresponding to the amount of change in the luminance value I in the captured images A. Consequently, a defect (defective portion Q) in the measurement region Pa of the inspection target P can be easily recognized.

[Advantages of Defect Inspection Method According to First Embodiment]

In the defect inspection method according to the first embodiment, the following advantages are obtained.

In the defect inspection according to the first embodiment, the amplitude D (approximate value) for defect inspection corresponding to the amount of change in the luminance value I in the captured images A is acquired by approximating the difference value or the absolute value $I\alpha$ of the difference value between the luminance value I (pixel value) in at least the three captured images A captured by the image sensor 34 (imager) in at least the three different phases of the elastic wave and the luminance value $I_{ave}$ (pixel value) in the reference image $A_{ave}$ separate from the captured images A by the above configuration. Accordingly, the amplitude D for defect inspection is acquired based on the luminance value I in the captured images A, and thus the defect inspection can be performed without measuring the displacement of the measurement region Pa in the out-of-plane direction even when the defect inspection is performed based on the interference light obtained by causing interference of the laser light reflected at the measurement region Pa. That is, the defect inspection can be performed by approximately detecting the state of the elastic wave excited in the measurement region Pa without measuring the displacement of the measurement region Pa. Therefore, the defect inspection can be performed based on the state of the elastic wave approximately detected without changing a phase difference between two rays of interfered laser light, and thus it is no longer necessary to make a plurality of measurements while changing the phase difference of the laser light in one phase of the elastic wave. That is, the defect inspection can be performed by making a smaller number of measurements (at least three measurements) as compared with a case in which a plurality of measurements (at least nine measurements) are made while a phase difference between two rays of interfered laser light is changed for each phase of the elastic wave. Consequently, it is possible to shorten the inspection time required when the defect inspection is performed based on the interference light obtained by causing interference of the laser light reflected at the measurement region Pa.

Second Embodiment

The configuration of a defect inspection apparatus 200 according to a second embodiment of the present invention is now described with reference to FIGS. 5 to 9. In this second embodiment, a control is performed to switch between a first detection control to acquire the vibration state without changing a phase difference between two rays of interfered laser light similarly to the first embodiment and a second detection control to measure the surface displacement of a measurement region Pa while changing a phase difference between two rays of interfered laser light, unlike the first embodiment in which the vibration state of the elastic wave excited in the measurement region Pa is acquired without changing the phase difference between two rays of interfered laser light. In the figures, the same or similar configurations as those of the first embodiment are denoted by the same reference numerals, and description thereof is omitted.

Figure 5:
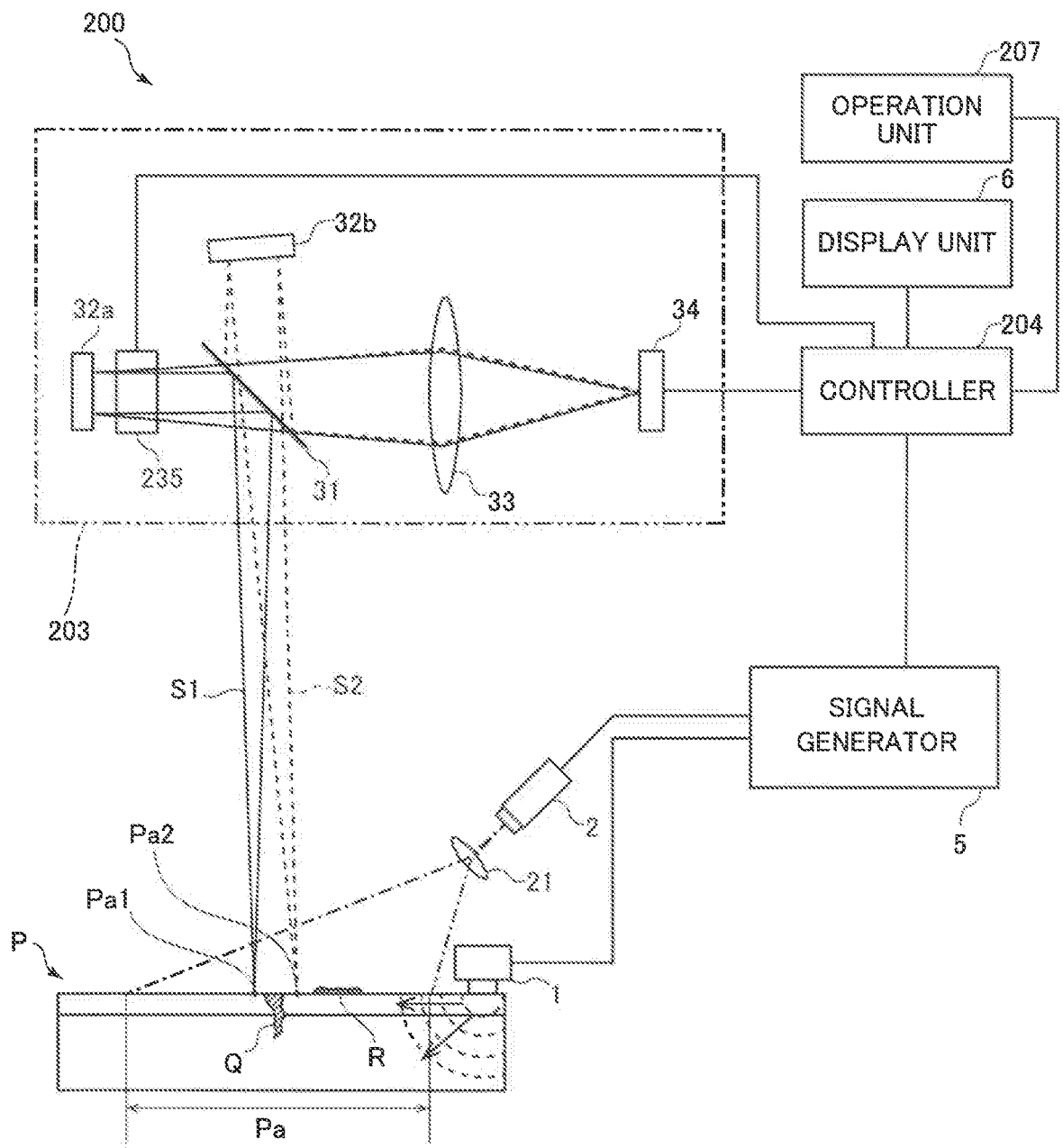
FIG. 5 is a diagram illustrating the configuration of a defect inspection apparatus according to a second embodiment.

As shown in FIG. 5, the defect inspection apparatus 200 according to the second embodiment includes a speckle shearing interferometer 203, a controller 204, and an operation unit 207.

Similarly to the first embodiment, the speckle shearing interferometer 203 causes interference of laser light reflected at two different points in the measurement region Pa excited by a vibrator 1. In the second embodiment, the speckle shearing interferometer 203 further includes a phase shifter 235.

The phase shifter 235 is arranged between a beam splitter 31 and a first reflecting mirror 32a, and changes (shifts) the phase of transmitted laser light (a straight line S1 in FIG. 5) under the control of the controller 204. That is, the phase shifter 235 changes the phase difference between two rays of interfered laser light.

The operation unit 207 receives an input operation for selecting whether to perform a defect inspection by the first detection control or to perform the defect inspection by the second detection control when the defect inspection is performed on the measurement region Pa of an inspection target P. Furthermore, the operation unit 207 receives an input operation for switching between the first detection control and the second detection control. The operation unit 207 includes a pointing device such as a keyboard or a mouse.

The controller 204 controls each portion of the defect inspection apparatus 200, similarly to the controller 4 according to the first embodiment. In the second embodiment, the controller 204 performs a control to switch between two controls including the first detection control to acquire, based on each luminance value I in at least three captured images A captured by an image sensor 34 in at least three different phases of an elastic wave, an amplitude D (approximate value) for defect inspection corresponding to the amount of change in the luminance value I in the captured images A without changing the phase difference between two rays of interfered laser light similarly to the first embodiment and the second detection control to measure the displacement of the measurement region Pa based on the intensity pattern of the interfered laser light imaged by the image sensor 34 while changing the phase difference between two rays of interfered laser light by the phase shifter 235 unlike the first embodiment.

(First Detection Control)

The controller 204 generates an approximate value image F by performing a process similar to that of the first embodiment in the first detection control. That is, the controller 204 control a display unit 6 to display the approximate value image F showing the distribution of the amplitude D, which is an approximate value for defect inspection corresponding to the amount of change in the luminance value I in the captured images A, based on the captured images $A_0$ to $A_3$ captured at timings j (j=0 to 3) in which the phases of the elastic wave are shifted by T/8 without changing the phase difference between two rays of interfered laser light without performing the phase shift of the laser light by the phase shifter 235.

(Second Detection Control)

In the second detection control, the controller 204 operates the phase shifter 235 arranged in the speckle shearing interferometer 203 by an actuator (not shown) to change the phase of transmitted laser light. Thus, a phase difference between laser light reflected at a point Pa1 and laser light reflected at a point Pa2 is changed. Each detection element of the image sensor 34 detects the intensity of interference light obtained by causing interference of these two rays of laser light.

In the second detection control, the controller 204 controls the vibration of the vibrator 1 and the timing of emission of laser light emitted by an irradiator 2 via a signal generator 5, and generates the captured images A while changing the phase shift amount. The controller 204 captures a total of thirty-seven images including thirty-two images for timings k (k=0 to 7) in which the phases of the elastic wave differ by T/8 at phase shift amounts (0, λ/4, λ/2, and 3λ/4) and five images when the irradiator 2 is off before and after the phase shift amounts (0, λ/4, λ/2, and 3λ/4). Note that A is the wavelength of laser light. Furthermore, T is the period of an elastic wave excited in the measurement region Pa.

In the second detection control, the controller 204 processes a detection signal detected in each of the detection elements of the image sensor 34 according to the following procedure, and generates a surface layer inspection image G that is an image representing the vibration state (a spatial distribution image of the vibration state).

In the second detection control, the controller 204 obtains an optical phase (a phase difference between two optical paths when the phase shift amount is zero) $\Phi_k$ from the luminance values $I_{k0}$ to $I_{k3}$ of four captured images $A_k$ ($A_{k0}$ to $A_{k3}$) that have the same elastic wave phase timing k (k=0 to 7) but different laser light phase shift amounts by λ/4 by a formula (5).

$$\Phi_k = -\arctan\{(I_{k3}-I_{k1})/(I_{k2}-I_{k0})\} \quad (5)$$

The controller 204 performs a sine wave approximation on the optical phase $\Phi_k$ by the least-square method, and obtains approximation coefficients X, φ, and Z in a formula (6).

$$\Phi_k = X\cos(\varphi+k\pi/4)+Z = Y\exp(k\pi/4)+Z \quad (6)$$

Y is a complex amplitude and is expressed as a formula (7):

$$Y = X\exp(i\varphi):\text{complex amplitude} \quad (7)$$

Furthermore, the controller 204 generates the surface layer inspection image G as a moving image (30 to 60 frames) representing an optical phase change at each phase time ξ (0≤ξ<2π) of the vibration of the elastic wave from an approximation formula obtained by removing the constant term Z from the formula (6). In the above process, a spatial filter is appropriately applied to the complex amplitude Y in order to remove noise. Furthermore, the phase shift amount and the step of the timing of emitting the laser light are not limited to these. In this case, the calculation formula is different from the above formulas (5) to (7).

Figure 6:
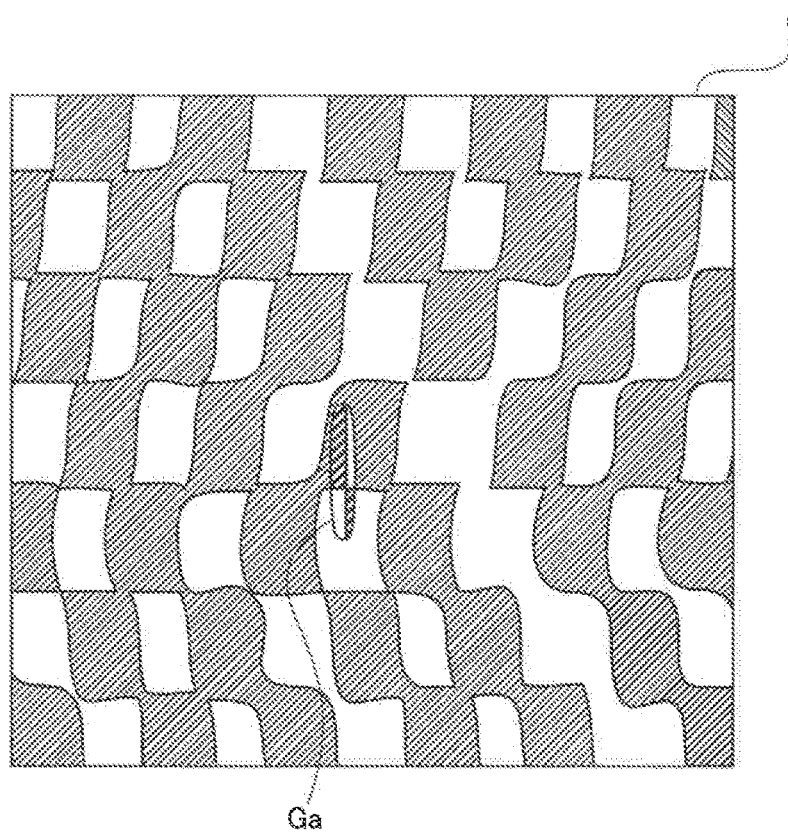
FIG. 6 is a diagram illustrating a surface layer inspection image generated by a second detection control according to the second embodiment.

In the second detection control, the controller 204 displays the surface layer inspection image G on the display unit 6 such that a discontinuous region Ga in the vibration state is visually recognizable as a defective portion Q generated inside the inspection target P, as shown in FIG. 6. When the shape of the inspection target P includes unevenness or the like, discontinuity in the vibration state may occur even at a boundary between a flat surface portion and an uneven portion. Therefore, the controller 204 may be configured or programmed to detect the defective portion Q generated inside based on shape information of the inspection target P so as not to detect the unevenness as a defect.

(Control to Switch Between First Detection Control and Second Detection Control)

Figure 7:
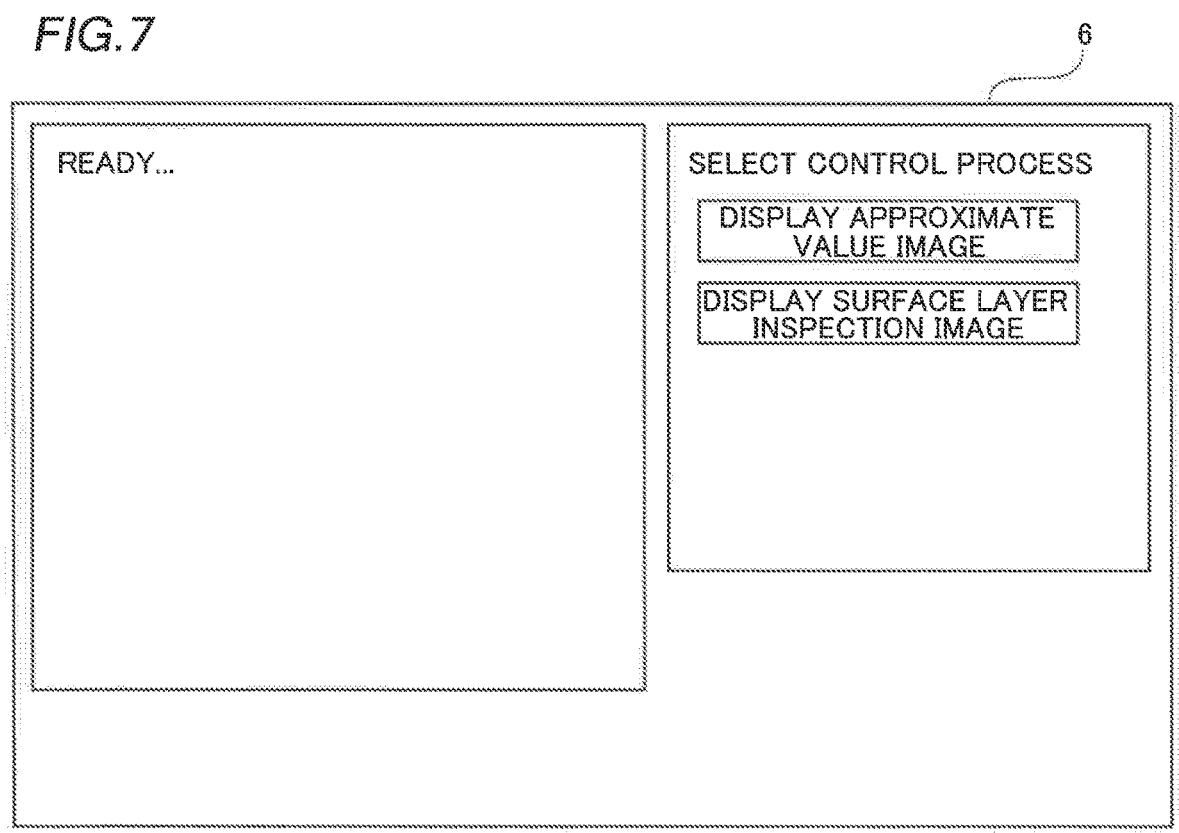
FIG. 7 is a diagram illustrating the display of a display unit for selection between a first detection control and the second detection control according to the second embodiment.

The controller 204 performs either a control to generate the approximate value image F by the first detection control or a control to generate the surface layer inspection image G by the second detection control based on an input operation on the operation unit 207. For example, as shown in FIG. 7, the controller 204 provides, on the display unit 6, a display for receiving a selection of whether to perform the defect inspection on the inspection target P by the first detection control or the second detection control. Then, the controller 204 performs the defect inspection by the first detection control or the second detection control based on an input operation on the operation unit 207.

Figure 8:
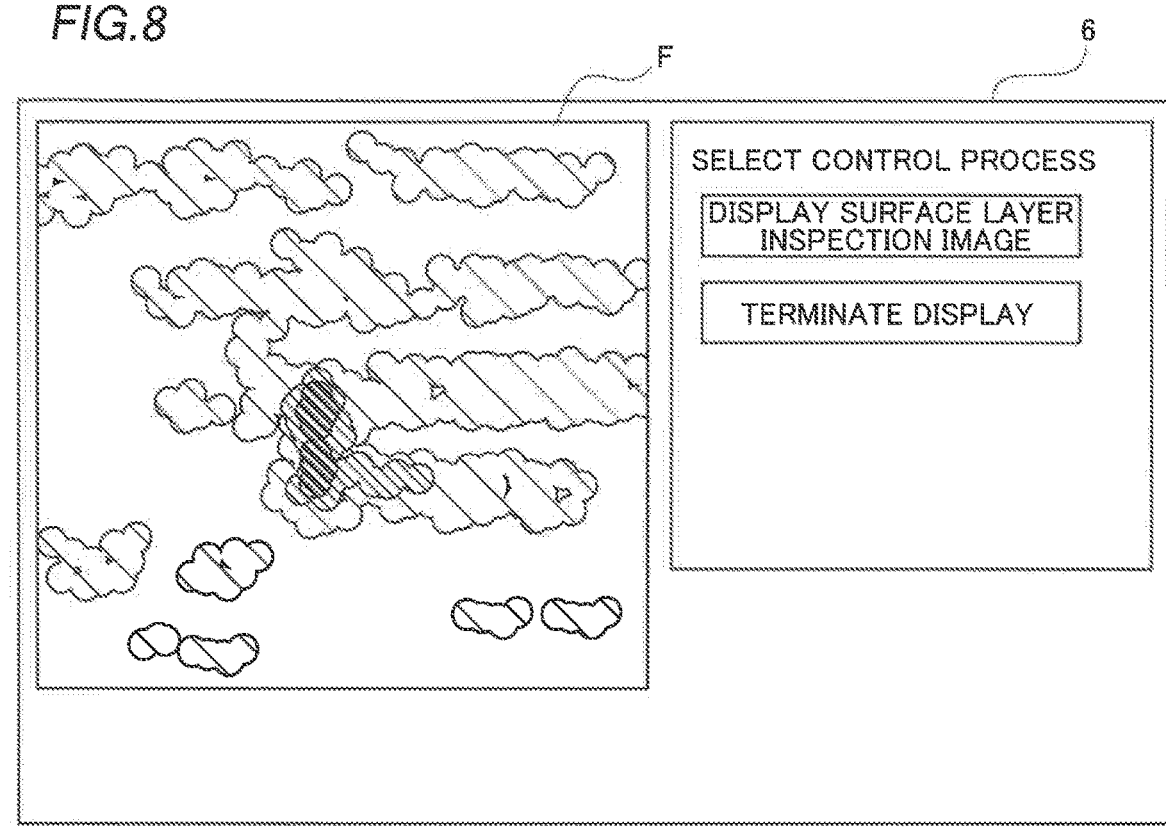
FIG. 8 is a diagram illustrating a display for starting the second detection control when an approximate value image according to the second embodiment is displayed.
Figure 9:
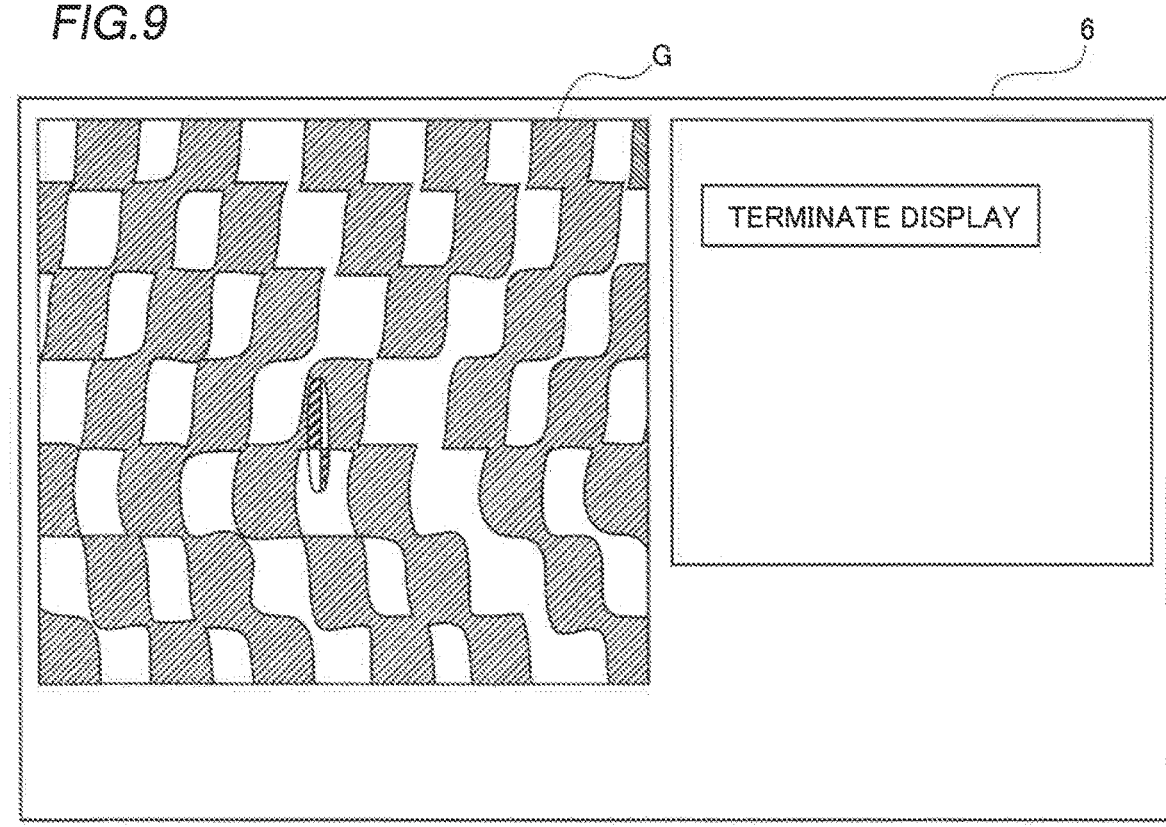
FIG. 9 is a diagram illustrating the display of the surface layer inspection image according to the second embodiment.

The controller 204 performs a control to switch between the first detection control and the second detection control based on an input operation on the operation unit 207. For example, as shown in FIG. 8, the controller 204 starts the second detection control based on an input operation on the operation unit 207 in a state in which the approximate value image F acquired by the first detection control is displayed on the display unit 6. Then, as shown in FIG. 9, the surface layer inspection image G generated by the second detection control is displayed on the display unit 6.

The controller 204 terminates the display of the approximate value image F and the surface layer inspection image G based on an input operation on the operation unit 207.

The remaining configurations of the second embodiment are similar to those of the first embodiment.

(Defect Inspection Method According to Second Embodiment)

Figure 10:
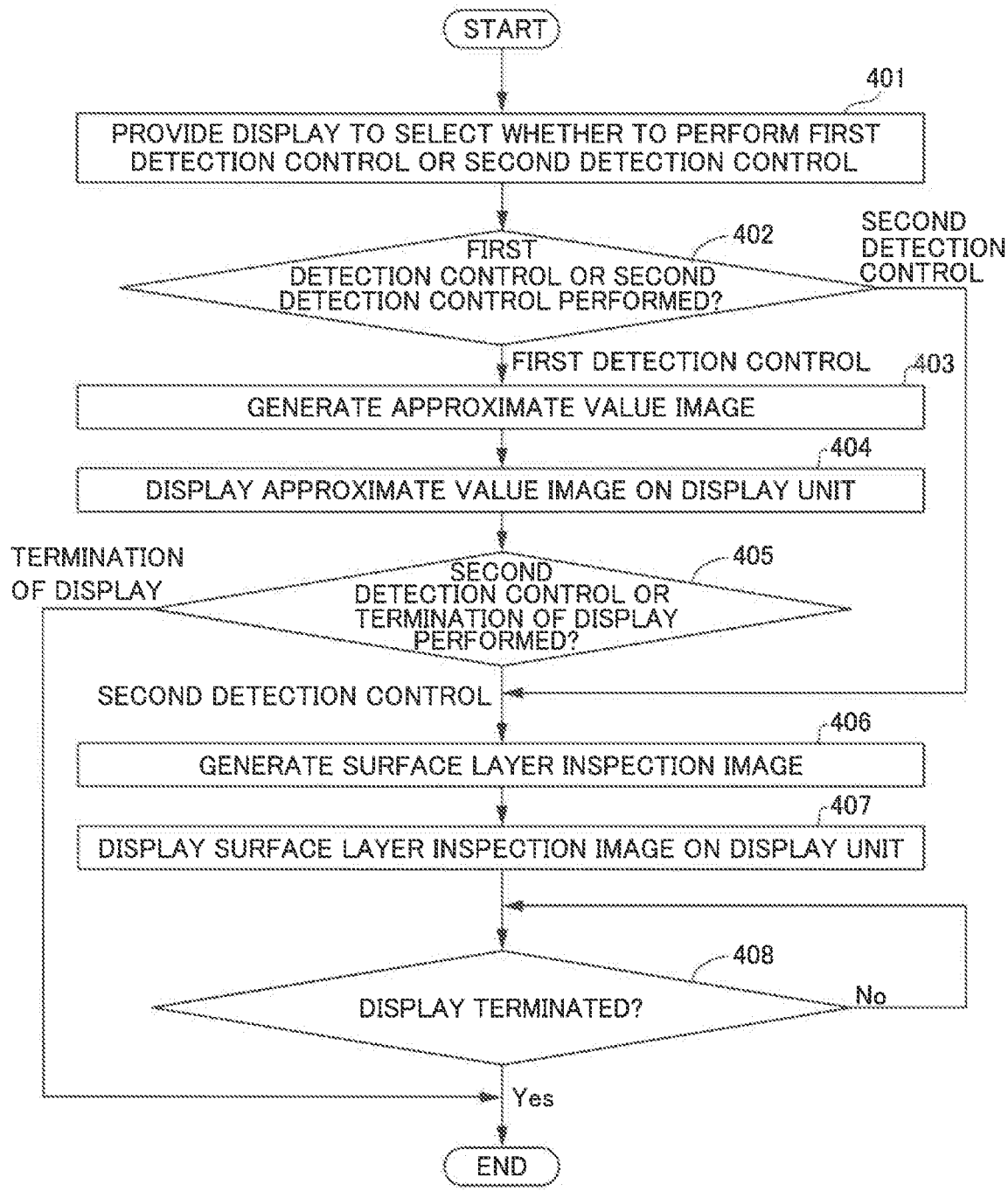
FIG. 10 is a diagram (flowchart) for illustrating a defect inspection method according to the second embodiment.

A defect inspection method using the defect inspection apparatus 200 according to this embodiment is now described with reference to FIG. 10. The same or similar methods (control processes) as those of the first embodiment are denoted by the same step numbers, and description thereof is omitted.

First, in step 401, a display for receiving a selection of whether to perform the defect inspection on the inspection target P by the first detection control or the second detection control is provided on the display unit 6.

Then, in step 402, it is determined whether or not an input operation for selecting whether to perform the defect inspection by the first detection control or the second detection control has been received. When it is determined that an input operation for selecting to perform the defect inspection by the first detection control has been received, the process advances to step 403. When it is determined that an input operation for selecting to perform the defect inspection by the second detection control has been received, the process advances to step 406.

In step 403, the defect inspection of the measurement region Pa of the inspection target P is performed by the first detection control. Then, the approximate value image F is generated by the first detection control.

Then, in step 404, the approximate value image F generated by the first detection control is displayed on the display unit 6.

Then, in step 405, it is determined whether an input operation for performing the defect inspection by the second detection control or an input operation for terminating the display has been received. When it is determined that the input operation for performing the defect inspection by the second detection control has been received, the process advances to step 406. When it is determined that the input operation for terminating the display has been received, the control by the defect inspection apparatus 200 is terminated.

In step 406, the defect inspection of the measurement region Pa of the inspection target P is performed by the second detection control. Then, the surface layer inspection image G is generated by the second detection control.

Then, in step 407, the surface layer inspection image G generated by the second detection control is displayed on the display unit 6.

Then, in step 408, it is determined whether or not an input operation for terminating the display has been received. When it is determined that the input operation for terminating the display has been received, the control by the defect inspection apparatus 200 is terminated.

Advantages of Second Embodiment

In the second embodiment, the following advantages are obtained.

In the second embodiment, as described above, the speckle shearing interferometer 203 (interference unit) includes the phase shifter 235 (optical member) to change the phase of the laser light, and the controller 204 is configured or programmed to perform a control to switch between two controls including the first detection control to acquire the amplitude D (approximate value) for defect inspection corresponding to the amount of change in the luminance value I in the captured images A based on the luminance value I (pixel value) in at least the three captured images A captured by the image sensor 34 (imager) in at least the three different phases of the elastic wave without changing the phase difference between two rays of interfered laser light and the second detection control to measure the displacement of the measurement region Pa based on the intensity pattern of the interfered laser light imaged by the image sensor 34 while changing the phase difference between two rays of interfered laser light by the phase shifter 235. Accordingly, in the first detection control, it is possible to acquire the amplitude D (approximate value) for defect inspection corresponding to the amount of change in the luminance value I in the captured images A without changing the phase difference between the two rays of interfered laser light. Therefore, the inspection time required for defect detection can be shortened as compared with the second detection control. Furthermore, in the second detection control, the displacement of the measurement region Pa can be measured by changing the phase difference between two rays of interfered laser light. Thus, the vibration state in each phase of the elastic wave can be detected based on the measured displacement, and thus the defect detection accuracy can be improved as compared with the first detection control. In the second embodiment, a control is performed to switch between the first detection control to acquire the amplitude D (approximate value) for defect inspection corresponding to the amount of change in the luminance value I in the captured images A without changing the phase difference between two rays of interfered laser light and the second detection control to measure the displacement of the measurement region Pa while changing the phase difference between two rays of interfered laser light. Accordingly, the defect detection operation can be performed while switching between the first detection control and the second detection control in consideration of the inspection time and the detection accuracy. Therefore, the control desired by an inspection operator can be selected and performed, and thus the work burden on the inspection operator can be reduced as compared with a case in which only one of the first detection control and the second detection control is performed.

In the second embodiment, as described above, the defect inspection apparatus 200 further includes the operation unit 207 to receive an input operation for switching between the first detection control and the second detection control. Furthermore, the controller 204 is configured or programmed to start the second detection control based on the input operation on the operation unit 207 when the approximate value image F representing the amplitude D (approximate value) for defect inspection corresponding to the amount of change in the luminance value I (pixel value) in the captured images A is being displayed by the first detection control. Accordingly, the first detection control is performed before the second detection control, which takes time to detect a defect, is started such that the vibration state of the elastic wave excited in the measurement region Pa can be visually recognized. Therefore, the first detection control is performed before the second detection control is started such that it can be confirmed that the vibration state (frequency and amplitude) of the elastic wave is appropriate for inspecting a defect. Consequently, the first detection control is performed such that it is possible to confirm the vibration state of the elastic wave in a shorter period of time as compared with the second detection control, and thus it is possible to shorten the time required to confirm that the vibration state of the elastic wave is appropriate.

The remaining advantages of the second embodiment are similar to those of the first embodiment.

Third Embodiment

The configuration of a defect inspection apparatus 300 according to a third embodiment of the present invention is now described with reference to FIGS. 11 to 14. In this third embodiment, a first detection control and a second detection control are performed in parallel, unlike the second embodiment in which a control is performed to switch between the first detection control and the second detection control. In the figures, the same or similar configurations as those of the first and second embodiments are denoted by the same reference numerals, and description thereof is omitted.

Figure 11:
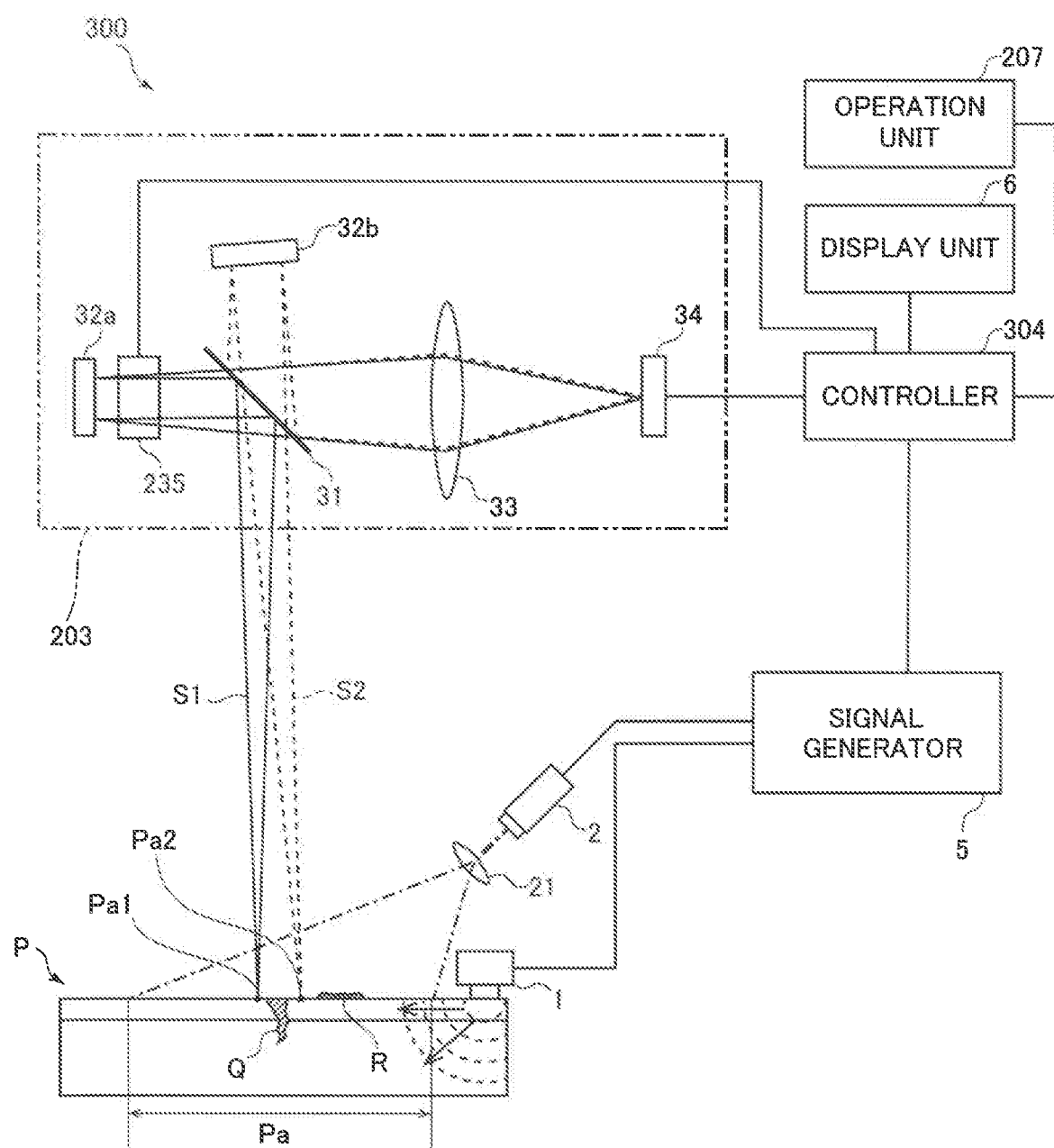
FIG. 11 is a diagram illustrating the configuration of a defect inspection apparatus according to a third embodiment.

The defect inspection apparatus 300 according to the third embodiment includes a controller 304, as shown in FIG. 11.

The controller 304 controls each portion of the defect inspection apparatus 300, similarly to the controller 204 according to the second embodiment. In the third embodiment, the controller 304 is configured or programmed to perform in parallel two controls including the first detection control to acquire, based on each luminance value I in at least three captured images A captured by an image sensor 34 in at least three different phases of an elastic wave, an amplitude D (approximate value) for defect inspection corresponding to the amount of change in the luminance value I in the captured images A without changing a phase difference between two rays of interfered laser light and the second detection control to measure the displacement of a measurement region Pa based on the intensity pattern of the interfered laser light imaged by the image sensor 34 while changing the phase difference between two rays of interfered laser light by a phase shifter 235. That is, the controller 304 is configured or programmed to perform in parallel the first detection control to display an approximate value image F on a display unit 6 and the second detection control to display a surface layer inspection image G on the display unit 6.

Figure 12:
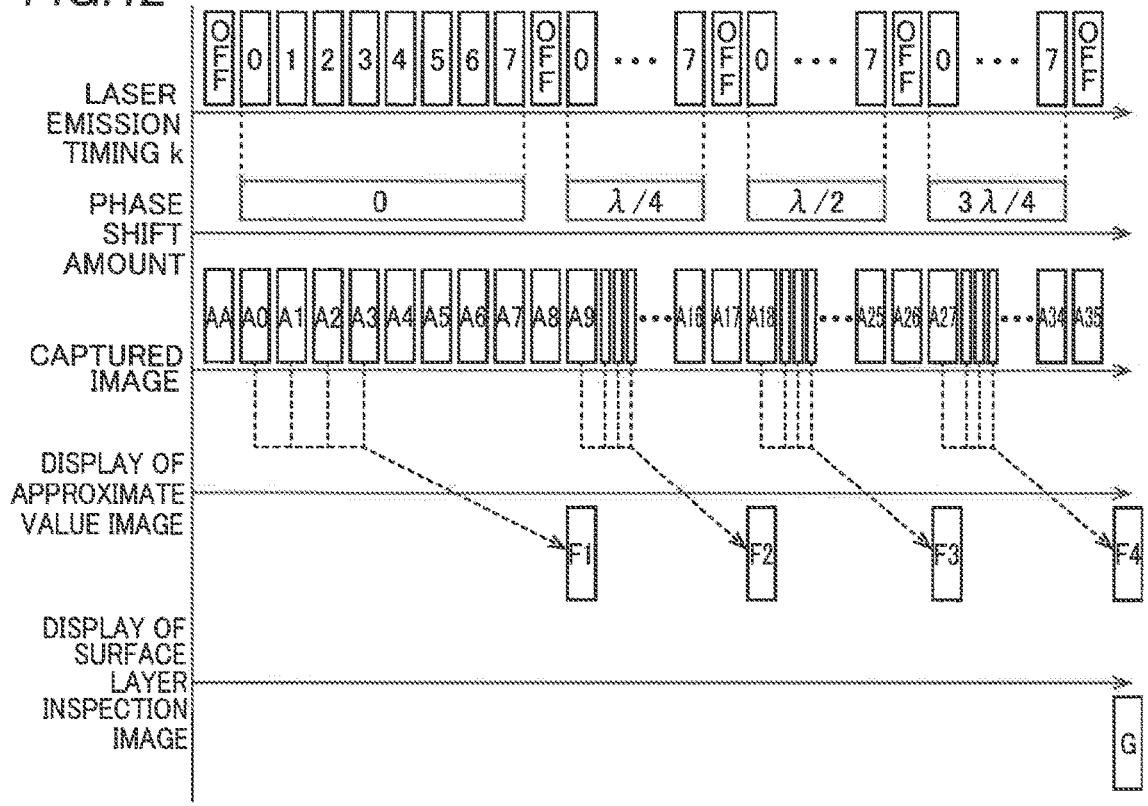
FIG. 12 is a diagram illustrating a first detection control and a second detection control according to the third embodiment.
Figure 13:
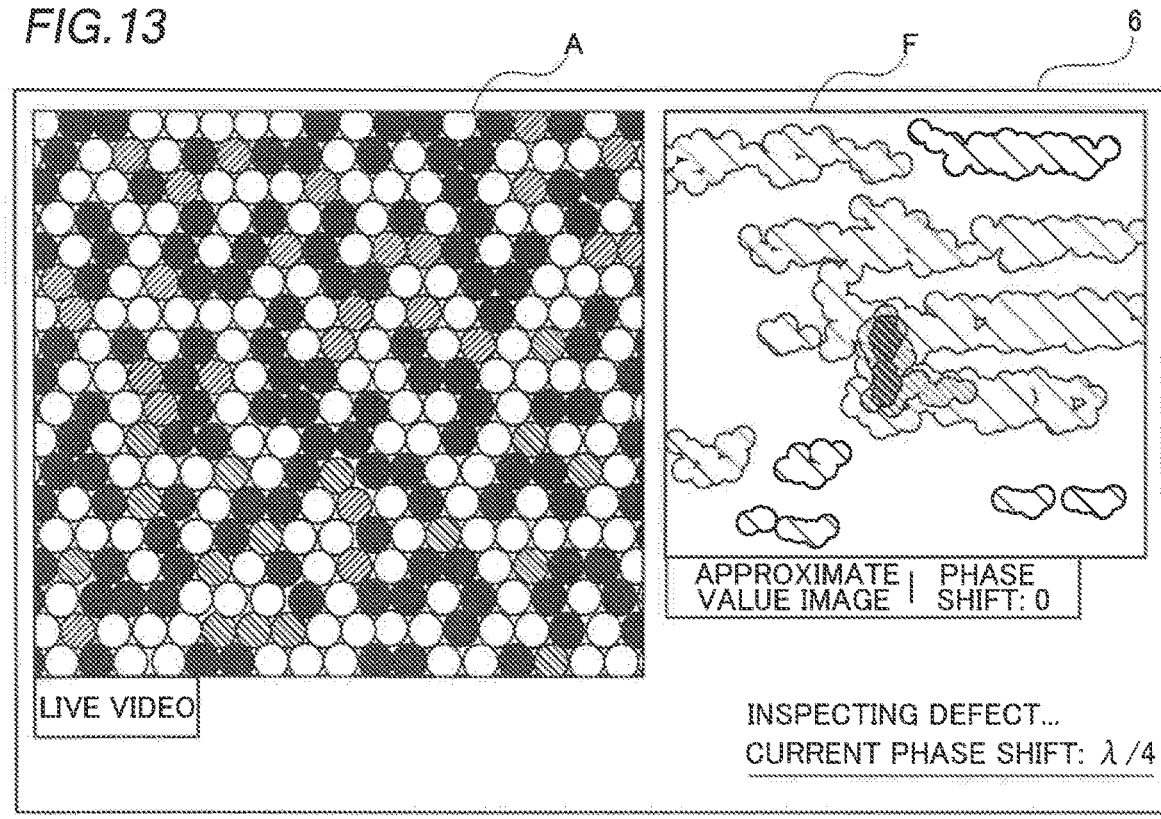
FIG. 13 is a diagram illustrating the display of a display unit according to the third embodiment.

Specifically, the controller 304 performs the first detection control and the second detection control in parallel based on an input operation on an operation unit 207. As shown in FIG. 12, the controller 304 generates the captured images A while changing the phase shift amount by the second detection control. That is, similarly to the second detection control according to the second embodiment, the phase shift amount is changed by $\lambda/4$, and a total of thirty-seven images including thirty-two images for timings k (k=0 to 7) in which the phases of the elastic wave differ by T/8 at phase shift amounts (0, $\lambda/4$, $\lambda/2$, and $3\lambda/4$) and five images when an irradiator 2 is off before and after the phase shift amounts (0, $\lambda/4$, A/2, and $3\lambda/4$) are captured. Furthermore, the controller 304 generates approximate value images F (F1 to F4) using four captured images A captured at four phase shift amounts by the first detection control in parallel to the second detection control. That is, the approximate value images F (F1 to F4) are generated using the captured images A captured at the timings k (k=0 to 4) at the four phase shift amounts. Then, the controller 304 displays the approximate value images F (F1 to F4) generated at the phase shift amounts on the display unit 6 in parallel to a control process by the second detection control. Furthermore, as shown in FIG. 13, the controller 304 displays a captured image A on the display unit 6 each time the captured image A is captured by the second detection control.

Figure 14:
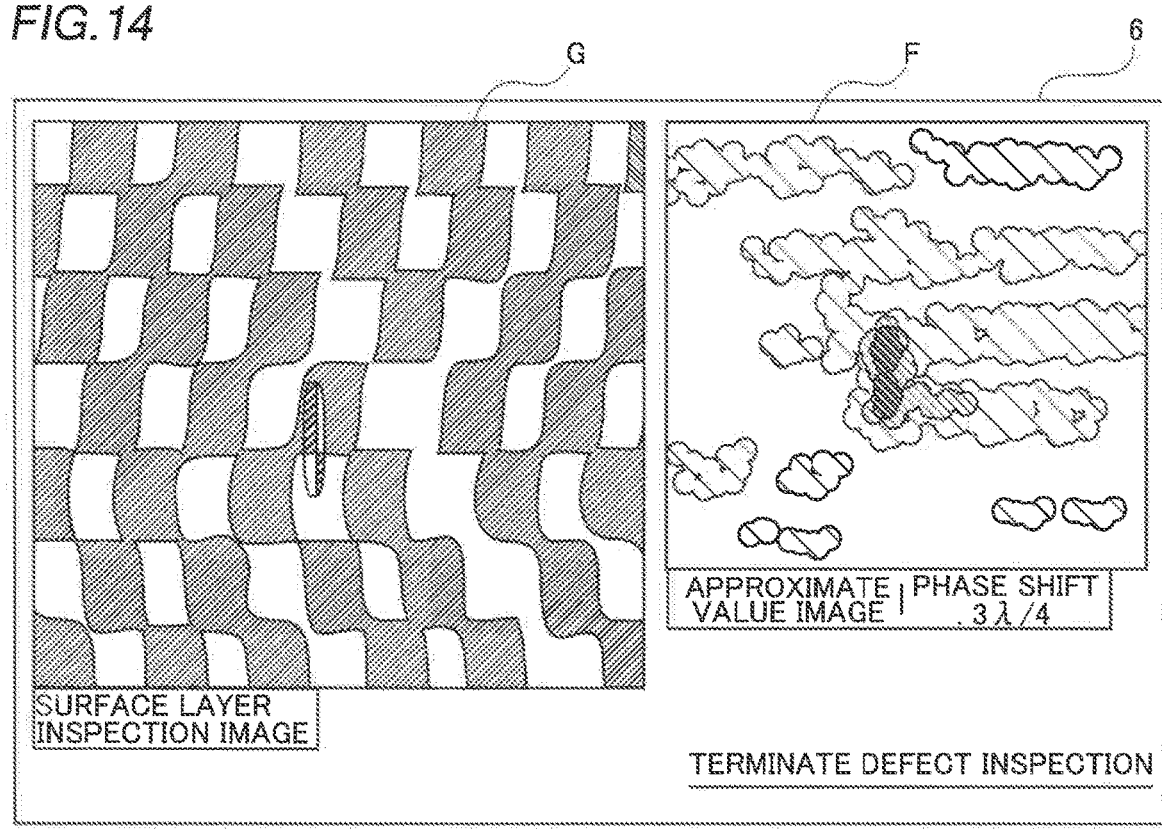
FIG. 14 is a diagram illustrating the display of an approximate value image and a surface layer inspection image according to the third embodiment.

As shown in FIG. 14, the controller 304 displays the surface layer inspection image G generated by the second detection control and the approximate value image F generated by the first detection control on the display unit 6.

The remaining configurations of the third embodiment are similar to those of the second embodiment.

(Control Process to Perform First Detection Control and Second Detection Control in Parallel)

Figure 15:
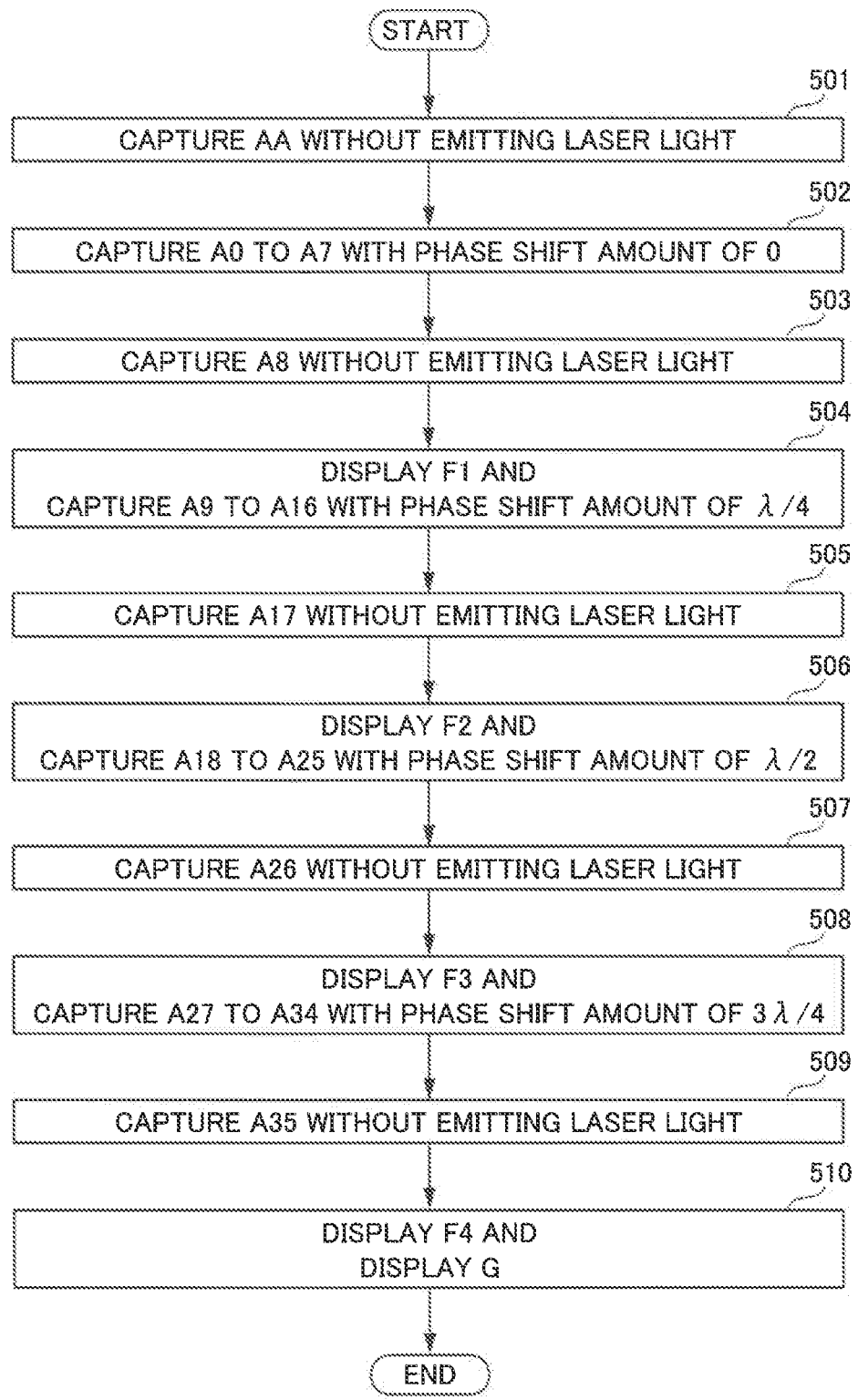
FIG. 15 is a diagram (flowchart) illustrating a control process in which the first detection control and the second detection control are performed in parallel according to the third embodiment.

A control process of the defect inspection apparatus 300 according to the third embodiment to perform the first detection control and the second detection control in parallel is now described based on a flowchart with reference to FIG. 15. The control process to perform the first detection control and the second detection control in parallel is performed by the controller 304.

As shown in FIG. 15, first, in step 501, a captured image AA is captured without emitting laser light by the irradiator 2 (with the irradiator 2 turned off).

Then, in step 502, laser light is emitted at each of the timings k (k=0 to 7) in which the phases of the elastic wave differ by T/8 without operating the phase shifter 235 (with a phase shift amount of 0) such that captured images A0 to A7 are captured.

Then, in step 503, a captured image A8 is captured without emitting laser light by the irradiator 2 (with the irradiator 2 turned off).

Then, in step 504, the approximate value image F1 generated based on the captured images A0 to A4 is displayed on the display unit 6. Furthermore, laser light is emitted at each of the timings k (k=0 to 7) in which the phases of the elastic wave differ by T/8 when the phase is changed by the phase shifter 235 and the phase shift amount is $\lambda/4$ such that captured images A9 to A16 are captured.

Then, in step 505, a captured image A17 is captured without emitting laser light by the irradiator 2 (with the irradiator 2 turned off).

Then, in step 506, the approximate value image F2 generated based on the captured images A9 to A12 is displayed on the display unit 6. Furthermore, laser light is emitted at each of the timings k (k=0 to 7) in which the phases of the elastic wave differ by T/8 when the phase is changed by the phase shifter 235 and the phase shift amount is $\lambda/2$ such that captured images A18 to A25 are captured.

Then, in step 507, a captured image A26 is captured without emitting laser light by the irradiator 2 (with the irradiator 2 turned off).

Then, in step 508, the approximate value image F3 generated based on the captured images A18 to A21 is displayed on the display unit 6. Furthermore, laser light is emitted at each of the timings k (k=0 to 7) in which the phases of the elastic wave differ by T/8 when the phase is changed by the phase shifter 235 and the phase shift amount is $3\lambda/4$ such that captured images A27 to A34 are captured.

Then, in step 509, a captured image A35 is captured without emitting laser light by the irradiator 2 (with the irradiator 2 turned off).

Then, in step 510, the approximate value image F4 generated based on the captured images A27 to A30 is displayed on the display unit 6. Furthermore, the surface layer inspection image G is displayed on the display unit 6 based on the captured images AA and A0 to A35.

Advantages of Third Embodiment

In the third embodiment, the following advantages are obtained.

In the third embodiment, as described above, the speckle shearing interferometer 203 (interference unit) includes the phase shifter 235 (optical member) to change the phase of the laser light, and the controller 304 is configured or programmed to perform in parallel two controls including the first detection control to acquire the amplitude D (approximate value) for defect inspection corresponding to the amount of change in the luminance value I in the captured images A based on the luminance value I (pixel value) in at least the three captured images A captured by the image sensor 34 (imager) in at least the three different phases of the elastic wave without changing the phase difference between two rays of interfered laser light and the second detection control to measure the displacement of the measurement region Pa based on the intensity pattern of the interfered laser light imaged by the image sensor 34 while changing the phase difference between two rays of interfered laser light by the phase shifter 235. Accordingly, the first detection control can be performed while the second detection control is being performed. Therefore, while the second detection control, which requires a large number of captured images and takes time, is being performed, the first detection control is performed to acquire the approximate value image F that approximately represents the state of the elastic wave. Consequently, the state of the elastic wave can be acquired before the surface layer inspection image G is generated by the second detection control, and thus the state of the elastic wave can be acquired more quickly. Thus, it can be quickly confirmed that the vibration of a vibrator 1 for exciting the elastic wave is appropriate. Therefore, even when the vibration of the vibrator 1 is inappropriate, the inspection operation can be quickly redone, and thus an increase in the time required for the inspection operation can be significantly reduced or prevented. Furthermore, the first detection control can be performed using the captured images A acquired during the second detection control. Therefore, even when both the first detection control and the second detection control are performed, it is not necessary to acquire a new captured image A in order to perform the first detection control. Consequently, it is possible to significantly reduce or prevent an increase in the inspection time when both the first detection control and the second detection control are performed.

The remaining advantages of the third embodiment are similar to those of the first and second embodiments.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the speckle shearing interferometer (interference unit) is configured to cause interference of laser light reflected at different positions in the measurement region by laser interferometry, and the controller is configured or programmed to approximate the difference value or the absolute value of the difference value between the luminance value (pixel value) in at least the three captured images and the luminance value in the reference image separate from the captured images without changing the phase difference between two rays of interfered laser light so as to acquire the amplitude (approximate value) for defect inspection corresponding to the amount of change in the luminance value in the captured images has been shown in each of the aforementioned first to third embodiments, the present invention is not limited to this. For example, the approximate value corresponding to the amount of change in the luminance value in the captured images may be acquired based on captured images captured while the phase difference between two rays of interfered laser light is changed.

While the example in which the controller is configured or programmed to approximate the difference value or the absolute value of the difference value between the luminance value (pixel value) in at least the three captured images and the luminance value (pixel value) in the reference image separate from the captured images such that the difference value or the absolute value of the difference value corresponds to the approximation function, which is a function representing a waveform, so as to acquire the amplitude (approximate value) for defect inspection corresponding to the amount of change in the luminance value in the captured images has been shown in each of the aforementioned first to third embodiments, the present invention is not limited to this. For example, the amplitude (approximate value) for defect inspection corresponding to the amount of change in the luminance value in the captured images may be acquired based on a measured value of the acquired luminance value without performing an approximation using the approximation function.

While the example in which the approximation function is a function that represents a waveform having half the period of the elastic wave, and the controller is configured or programmed to approximate the absolute value of the difference value between the luminance value (pixel value) in at least the three captured images and the luminance value in the reference image separate from the captured images such that the absolute value of the difference value corresponds to the function that represents a waveform having half the period of the elastic wave so as to acquire the amplitude (approximate value) for defect inspection corresponding to the amount of change in the luminance value in the captured images has been shown in each of the aforementioned first to third embodiments, the present invention is not limited to this. For example, a periodic function having the same period as that of the elastic wave may be used as the approximation function.

While the example in which the approximation function is a function that represents a sine wave, and the controller is configured or programmed to approximate the difference value or the absolute value of the difference value between the luminance value (pixel value) in at least the three captured images and the luminance value (pixel value) in the reference image separate from the captured images such that the difference value or the absolute value of the difference value corresponds to the function that represents a sine wave so as to acquire the amplitude (approximate value) for defect inspection corresponding to the amount of change in the luminance value in the captured images has been shown in each of the aforementioned first to third embodiments, the present invention is not limited to this. For example, a periodic function that is not a function that represents a sine wave may be used as the approximation function. For example, a function that represents a triangular wave may be used as the approximation function.

While the example in which the reference image is an average image of at least the three captured images, and the controller is configured or programmed to acquire the amplitude (approximate value) for defect inspection corresponding to the amount of change in the luminance value in the captured images based on the difference value or the absolute value of the difference value between the luminance value (pixel value) in at least the three captured images and the luminance value in the average image of at least the three captured images has been shown in each of the aforementioned first to third embodiments, the present invention is not limited to this. For example, a new image captured separately from at least the three captured images may be used as the reference image. Alternatively, an average image of two of at least the three captured images may be used as the reference image. Alternatively, a predetermined image may be used as the reference image.

While the example in which the controller is configured or programmed to generate the approximate value image representing the amplitude (approximate value) for defect inspection corresponding to the amount of change in the luminance value (pixel value) in the captured images has been shown in each of the aforementioned first to third embodiments, the present invention is not limited to this. For example, the coordinates of the captured images indicating a region in which the approximate value is larger than a predetermined value may be represented.

While the example in the speckle shearing interferometer (interference unit) includes the phase shifter (optical member) to change the phase of the laser light, and the controller is configured or programmed to perform a control to switch between two controls including the first detection control to acquire the amplitude (approximate value) for defect inspection corresponding to the amount of change in the luminance value in the captured images based on the luminance value (pixel value) in at least the three captured images captured by the image sensor (imager) in at least the three different phases of the elastic wave without changing the phase difference between two rays of interfered laser light and the second detection control to measure the displacement of the measurement region based on the intensity pattern of the interfered laser light imaged by the image sensor while changing the phase difference between two rays of interfered laser light by the phase shifter has been shown in the aforementioned second embodiment, the present invention is not limited to this. For example, in the first detection control, the approximate value corresponding to the amount of change in the luminance value in the captured images may be acquired while the phase difference between two rays of interfered laser light is changed. Alternatively, switching between the first detection control and the second detection control may not be performed, but the first detection control and the second detection control may be performed at the same time.

While the example in which the operation unit is further provided to receive an input operation for switching between the first detection control and the second detection control, and the controller is configured or programmed to start the second detection control based on the input operation on the operation unit when the approximate value image representing the approximate value for defect inspection corresponding to the amount of change in the pixel value in the captured images is being displayed by the first detection control has been shown in the aforementioned second embodiment, the present invention is not limited to this. For example, the first detection control may be started when the surface layer inspection image acquired by the second detection control is being displayed.

While the example in which the speckle shearing interferometer (interference unit) includes the phase shifter (optical member) to change the phase of the laser light, and the controller is configured or programmed to perform in parallel two controls including the first detection control to acquire, based on the luminance value (pixel value) in at least the three captured images captured by the image sensor (imager) in at least the three different phases of the elastic wave, the amplitude (approximate value) for defect inspection corresponding to the amount of change in the luminance value in the captured images without changing the phase difference between two rays of interfered laser light and the second detection control to measure the displacement of the measurement region based on the intensity pattern of the interfered laser light imaged by the image sensor while changing the phase difference between two rays of interfered laser light by the phase shifter has been shown in the aforementioned third embodiment, the present invention is not limited to this. For example, a controller configured or programmed to perform the first detection control and a controller configured or programmed to perform the second detection control may be provided separately from each other, and may perform a control process.

While the example in which the vibrator is used as an exciter to apply a mechanical vibration to the inspection target has been shown in each of the aforementioned first to third embodiments, the present invention is not limited to this. For example, a speaker or the like may be used to output sound in order to excite the inspection target.

While the example in which the speckle shearing interferometer includes the beam splitter, the first reflecting mirror, the second reflecting mirror, the condenser lens, and the image sensor has been shown in each of the aforementioned first to third embodiments, the present invention is not limited to this. For example, the speckle shearing interferometer may include a window and/or various optical filters in an optical path for light that is reflected from the inspection target and enters the image sensor for the purpose of protecting optical components, improving the signal-to-noise ratio of the apparatus, etc.

While the example in which the speckle shearing interferometer using a half mirror is used as the interference unit has been shown in each of the aforementioned first to third embodiments, the present invention is not limited to this. For example, the interference unit may be another optical interferometer.

While the example in which the controller is configured or programmed to approximate the absolute value of the difference value between the pixel value in at least the three captured images captured by the imager in at least the three different phases of the elastic wave and the pixel value in the reference image separate from the captured images so as to acquire the approximate value for defect inspection corresponding to the amount of change in the pixel value in the captured images has been shown in each of the aforementioned first to third embodiments, the present invention is not limited to this. The controller may be configured or programmed to approximate a difference value between each pixel value in at least three captured images and each pixel value in the reference image separate from the captured images so as to acquire an approximate value for defect inspection corresponding to the amount of change in the pixel value in the captured images.

Aspects

It will be appreciated by those skilled in the art that the exemplary embodiments described above are specific examples of the following aspects.

(Item 1)

A defect inspection apparatus comprising:
an exciter configured to excite an elastic wave in a measurement region of an inspection target;
an irradiator configured to emit laser light to the measurement region;
an interference unit configured to cause interference of the laser light reflected at the measurement region by laser interferometry;
an imager configured to image the interfered laser light; and
a controller configured or programmed to control the exciter and control imaging of the interfered laser light by the imager; wherein
the controller is configured or programmed to approximate a difference value or an absolute value of the difference value between a pixel value in at least three captured images captured by the imager in at least three different phases of the elastic wave and a pixel value in a reference image separate from the captured images so as to acquire an approximate value for defect inspection corresponding to an amount of change in the pixel value in the captured images.

(Item 2)

The defect inspection apparatus according to item 1, wherein
the interference unit is configured to cause interference of the laser light reflected at different positions in the measurement region by the laser interferometry; and
the controller is configured or programmed to approximate the difference value or the absolute value of the difference value between the pixel value in the at least three captured images and the pixel value in the reference image separate from the captured images without changing a phase difference between two rays of the interfered laser light so as to acquire the approximate value for defect inspection corresponding to the amount of change in the pixel value in the captured images.

(Item 3)

The defect inspection apparatus according to item 2, wherein the controller is configured or programmed to approximate the difference value or the absolute value of the difference value between the pixel value in the at least three captured images and the pixel value in the reference image separate from the captured images such that the difference value or the absolute value of the difference value corresponds to an approximation function that is a function representing a waveform so as to acquire the approximate value for defect inspection corresponding to the amount of change in the pixel value in the captured images.

(Item 4)

The defect inspection apparatus according to item 3, wherein
the approximation function is a function that represents a waveform having half a period of the elastic wave; and
the controller is configured or programmed to approximate the absolute value of the difference value between the pixel value in the at least three captured images and the pixel value in the reference image separate from the captured images such that the absolute value of the difference value corresponds to the function that represents the waveform having half the period of the elastic wave so as to acquire the approximate value for defect inspection corresponding to the amount of change in the pixel value in the captured images.

(Item 5)

The defect inspection apparatus according to item 3 or 4, wherein
the approximation function is a function that represents a sine wave; and
the controller is configured or programmed to approximate the difference value or the absolute value of the difference value between the pixel value in the at least three captured images and the pixel value in the reference image separate from the captured images such that the difference value or the absolute value of the difference value corresponds to the function that represents the sine wave so as to acquire the approximate value for defect inspection corresponding to the amount of change in the pixel value in the captured images.

(Item 6)

The defect inspection apparatus according to any one of items 2 to 5, wherein the reference image is an average image of the at least three captured images; and
the controller is configured or programmed to acquire, based on a difference value or an absolute value of the difference value between the pixel value in the at least three captured images and a pixel value in the average image of the at least three captured images, the approximate value for defect inspection corresponding to the amount of change in the pixel value in the captured images.

(Item 7)

The defect inspection apparatus according to any one of items 1 to 6, wherein the controller is configured or programmed to generate an approximate value image that represents the approximate value for defect inspection corresponding to the amount of change in the pixel value in the captured images.

(Item 8)

The defect inspection apparatus according to any one of items 1 to 7, wherein
the interference unit includes an optical member configured to change a phase of the laser light; and
the controller is configured or programmed to perform a control to switch between two controls including a first detection control to acquire, based on the pixel value in the at least three captured images captured by the imager in the at least three different phases of the elastic wave, the approximate value for defect inspection corresponding to the amount of change in the pixel value in the captured images without changing a phase difference between two rays of the interfered laser light and a second detection control to measure a displacement of the measurement region based on an intensity pattern of the interfered laser light imaged by the imager while changing the phase difference between the two rays of the interfered laser light by the optical member.

(Item 9)

The defect inspection apparatus according to item 8, further comprising:
an operation unit configured to receive an input operation for switching between the first detection control and the second detection control; wherein
the controller is configured or programmed to start the second detection control based on the input operation on the operation unit when an approximate value image representing the approximate value for defect inspection corresponding to the amount of change in the pixel value in the captured images is being displayed by the first detection control.

(Item 10)

The defect inspection apparatus according to any one of items 1 to 7, wherein
the interference unit includes an optical member configured to change a phase of the laser light; and
the controller is configured or programmed to perform in parallel two controls including a first detection control to acquire, based on the pixel value in the at least three captured images captured by the imager in the at least three different phases of the elastic wave, the approximate value for defect inspection corresponding to the amount of change in the pixel value in the captured images without changing a phase difference between two rays of the interfered laser light and a second detection control to measure a displacement of the measurement region based on an intensity pattern of the interfered laser light imaged by the imager while changing the phase difference between the two rays of the interfered laser light by the optical member.

(Item 11)

A defect inspection method comprising:
exciting an elastic wave in a measurement region of an inspection target;
emitting laser light to the measurement region;
causing interference of the laser light reflected at the measurement region by laser interferometry;
imaging the interfered laser light; and
approximating a difference value or an absolute value of the difference value between a pixel value in at least three captured images captured in at least three different phases of the elastic wave and a pixel value in a reference image separate from the captured images to acquire an approximate value for defect inspection corresponding to an amount of change in the pixel value in the captured images.

DESCRIPTION OF REFERENCE NUMERALS

1: vibrator (exciter)
2: irradiator
3, 203: speckle shearing interferometer (interference unit)
4, 204, 304: controller
34: image sensor (imager)
100, 200, 300: defect inspection apparatus
207: operation unit
235: phase shifter (optical member)

The invention claimed is:

1. A defect inspection apparatus comprising:
an exciter configured to excite an elastic wave in a measurement region of an inspection target;
an irradiator configured to emit laser light to the measurement region;
an interference unit configured to cause interference of the laser light reflected at the measurement region by laser interferometry;
an imager configured to image the interfered laser light; and
a controller configured or programmed to control the exciter and control imaging of the interfered laser light by the imager; wherein
the controller is configured or programmed to approximate a difference value or an absolute value of the difference value between a pixel value in at least three captured images captured by the imager in at least three different phases of the elastic wave and a pixel value in a reference image acquired based on at least some of the at least three captured images so as to acquire an approximate value image approximately representing distribution of an amount of change in the pixel value in the captured images, and display the approximate value image on a display.

2. The defect inspection apparatus according to claim 1, wherein
the interference unit is configured to cause interference of the laser light reflected at different positions in the measurement region by the laser interferometry; and
the controller is configured or programmed to approximate the difference value or the absolute value of the difference value between the pixel value in the at least three captured images and the pixel value in the reference image separate from the captured images without changing a phase difference between two rays of the interfered laser light so as to acquire the approximate value image approximately representing the distribution of the amount of change in the pixel value in the captured images.

3. The defect inspection apparatus according to claim 2, wherein the controller is configured or programmed to approximate the difference value or the absolute value of the difference value between the pixel value in the at least three captured images and the pixel value in the reference image separate from the captured images such that the difference value or the absolute value of the difference value corresponds to an approximation function that is a function representing a waveform so as to acquire the approximate value image approximately representing the distribution of the amount of change in the pixel value in the captured images.

4. The defect inspection apparatus according to claim 3, wherein
the approximation function is a function that represents a waveform having half a period of the elastic wave; and
the controller is configured or programmed to approximate the absolute value of the difference value between the pixel value in the at least three captured images and the pixel value in the reference image separate from the captured images such that the absolute value of the difference value corresponds to the function that represents the waveform having half the period of the elastic wave so as to acquire the approximate value image approximately representing the distribution of the amount of change in the pixel value in the captured images.

5. The defect inspection apparatus according to claim 3, wherein
the approximation function is a function that represents a sine wave; and
the controller is configured or programmed to approximate the difference value or the absolute value of the difference value between the pixel value in the at least three captured images and the pixel value in the reference image separate from the captured images such that the difference value or the absolute value of the difference value corresponds to the function that represents the sine wave so as to acquire the approximate value image approximately representing the distribution of the amount of change in the pixel value in the captured images.

6. The defect inspection apparatus according to claim 2, wherein
the reference image is an average image of the at least three captured images; and
the controller is configured or programmed to acquire, based on a difference value or an absolute value of the difference value between the pixel value in the at least three captured images and a pixel value in the average image of the at least three captured images, the approximate value image approximately representing the distribution of the amount of change in the pixel value in the captured images.

7. The defect inspection apparatus according to claim 1, wherein
the interference unit includes an optical member configured to change a phase of the laser light; and
the controller is configured or programmed to perform a control to switch between two controls including a first detection control to acquire, based on the pixel value in the at least three captured images captured by the imager in the at least three different phases of the elastic wave, the approximate value image approximately representing the distribution of the amount of change in the pixel value in the captured images without changing a phase difference between two rays of the interfered laser light and a second detection control to measure a displacement of the measurement region based on an intensity pattern of the interfered laser light imaged by the imager while changing the phase difference between the two rays of the interfered laser light by the optical member.

8. The defect inspection apparatus according to claim 7, further comprising:
an operation unit configured to receive an input operation for switching between the first detection control and the second detection control; wherein
the controller is configured or programmed to start the second detection control based on the input operation on the operation unit when the approximate value image approximately representing the distribution of the amount of change in the pixel value in the captured images is being displayed by the first detection control.

9. The defect inspection apparatus according to claim 1, wherein
the interference unit includes an optical member configured to change a phase of the laser light; and
the controller is configured or programmed to perform in parallel two controls including a first detection control to acquire, based on the pixel value in the at least three captured images captured by the imager in the at least three different phases of the elastic wave, the approximate value image approximately representing the distribution of the amount of change in the pixel value in the captured images without changing a phase difference between two rays of the interfered laser light and a second detection control to measure a displacement of the measurement region based on an intensity pattern of the interfered laser light imaged by the imager while changing the phase difference between the two rays of the interfered laser light by the optical member.

10. A defect inspection method comprising:
exciting an elastic wave in a measurement region of an inspection target;
emitting laser light to the measurement region;
causing interference of the laser light reflected at the measurement region by laser interferometry;
imaging the interfered laser light;
approximating a difference value or an absolute value of the difference value between a pixel value in at least three captured images captured in at least three different phases of the elastic wave and a pixel value in a reference image acquired based on at least some of the at least three captured images to acquire an approximate value image approximately representing a distribution of an amount of change in the pixel value in the captured images; and
displaying the approximate value image on a display.

* * * * *